United States Patent
Lee et al.

(10) Patent No.: US 8,837,384 B2
(45) Date of Patent: Sep. 16, 2014

(54) PHYSICAL CHANNEL COMMUNICATION METHOD FOR RANDOM ACCESS IN WIRELESS COMMUNICATION SYSTEM

(75) Inventors: In Ho Lee, Suwon-si (KR); Joon-Young Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 171 days.

(21) Appl. No.: 12/699,500

(22) Filed: Feb. 3, 2010

(65) Prior Publication Data

US 2010/0195607 A1 Aug. 5, 2010

(30) Foreign Application Priority Data

Feb. 3, 2009 (KR) .................... 10-2009-0008437

(51) Int. Cl.
*H04W 72/04* (2009.01)
*H04W 74/08* (2009.01)
*H04W 48/16* (2009.01)
*H04W 88/04* (2009.01)

(52) U.S. Cl.
CPC .......... *H04W 74/0866* (2013.01); *H04W 48/16* (2013.01); *H04W 72/042* (2013.01); *H04W 88/04* (2013.01)
USPC ..................................................... 370/329

(58) Field of Classification Search
CPC ............. H04W 48/16; H04W 72/042; H04W 72/0866; H04W 88/04
USPC .............. 370/229, 230, 230.1, 310, 315, 328, 370/329; 455/403, 422.1, 435.1, 450, 452.1
See application file for complete search history.

(56) References Cited

U.S. PATENT DOCUMENTS

| | | | |
|---|---|---|---|
| 2002/0025812 A1* | 2/2002 | Ahlstrand et al. | 455/435 |
| 2006/0252367 A1 | 11/2006 | Haartsen | |
| 2008/0075094 A1 | 3/2008 | Ahn et al. | |
| 2008/0235314 A1 | 9/2008 | Lee et al. | |
| 2009/0011769 A1 | 1/2009 | Park et al. | |
| 2009/0180436 A1* | 7/2009 | Vujcic | 370/330 |
| 2009/0316641 A1* | 12/2009 | Yamada et al. | 370/329 |
| 2009/0316642 A1* | 12/2009 | Yamada et al. | 370/329 |
| 2010/0002582 A1* | 1/2010 | Luft et al. | 370/230.1 |

(Continued)

FOREIGN PATENT DOCUMENTS

EP 1 701 490 9/2006

OTHER PUBLICATIONS

Mitsubishi Electric, "Basic Structure of Relaying under Multi-antenna eNB", 3GPP TSG RAN WG #55, Jan. 12-16, 2009.

(Continued)

*Primary Examiner* — Chi Pham
*Assistant Examiner* — Robert Lopata
(74) *Attorney, Agent, or Firm* — The Farrell Law Firm, P.C.

(57) ABSTRACT

A physical channel communication method and apparatus for random access in a cellular communication system including a plurality of relay nodes and user equipments using the same system information is provided. The physical channel communication method for random access in a wireless communication system according to the present invention includes receiving, by at least two relay nodes connected to a base station, system information containing a Physical Random Access CHannel (PRACH) region allocation information for identifying user equipments attached to the relay nodes; receiving PRACHs for random accesses transmitted by the user equipments; and transmitting the PRACHs to the base station on relay node-specific resource regions according to the PRACH region allocation information.

20 Claims, 15 Drawing Sheets

(56) References Cited

U.S. PATENT DOCUMENTS

| | | | |
|---|---|---|---|
| 2010/0034135 A1* | 2/2010 | Kim et al. | 370/315 |
| 2010/0080181 A1* | 4/2010 | Yamada et al. | 370/329 |
| 2010/0113053 A1* | 5/2010 | Bienas et al. | 455/452.1 |
| 2010/0167743 A1* | 7/2010 | Palanki et al. | 455/436 |

OTHER PUBLICATIONS

Texas Instruments, "On the Design of Relay Node for LTE-Advanced", R1-090290, 3GPP TSG RAN WG1 #55bis, Jan. 12-16, 2009.

Senthil Kumar, "Random Access Channel (RACH) Procedure", XP-002720936, Jul. 28, 2007.

* cited by examiner

PHYSICAL CHANNEL COMMUNICATION METHOD FOR RANDOM ACCESS IN WIRELESS COMMUNICATION SYSTEM

PRIORITY

This application claims priority to an application filed in the Korean Patent Office on Feb. 3, 2009 and assigned Serial No. 10-2009-008437, the contents of which are hereby incorporated by reference.

BACKGROUND OF THE INVENTION

1. Field of the Invention

The present invention relates to a cellular communication system and, in particular, to a physical channel communication method and apparatus for random access in a cellular communication system including a plurality of relay nodes and user equipments using the same system information.

2. Description of the Related Art

Recently, Orthogonal Frequency Division Multiplexing (OFDM) has been adopted into many communication and broadcast systems. OFDM is robust against multipath fading and intersymbol interference, guarantees orthogonality among intra-cell users, and allows for an efficient use of the available radio frequency spectrum. Due to these advantageous factors, OFDM is a strong candidate for high speed broadband wireless communications as compared to Direct Sequence Code Division Multiple Access (DS-CDMA).

FIG. 1 is a diagram illustrating an OFDM-based downlink frame structure in Evolved Universal Terrestrial Radio Access (EUTRA) specified in the $3^{rd}$ Generation Partnership Project (3GPP) standards. Referring to FIG. 1, the 20 MHz system bandwidth 101 is divided into 100 Resource Blocks (RBs) 105. An RB consists of 12 consecutive subcarriers 103 by 14 OFDM symbol periods. Each subcarrier 103 for one OFDM symbol duration carries a modulation symbol of downlink channel. Each box within the resource grid representing a single carrier for one symbol period is referred to as a Resource Element (RE) 106. In FIG. 1, the RB is composed of total 168 REs (14 OFDM symbols×12 subcarriers). A single downlink data channel can be assigned one or more RBs for one OFDM symbol duration 104 according to the data rate.

In the cellular communication system, bandwidth scalability is one of the key performance attributes for providing high speed wireless data service. For instance, the Long Term Evolution (LTE) system supports various bandwidths of 20 MHz, 15 MHz, 10 MHz, 5 MHz, 3 MHz, and 1.4 MHz as shown in FIG. 2. Accordingly, the LTE service provider can select one of the available bandwidths, and a mobile terminal also can be configured to support various capacities of 1.4 MHz to 20 MHz bandwidth. In order to fulfill International Mobile Telecommunication (IMT)-Advanced requirements, LTE-Advanced (LTE-A) supports carrier aggregation to allocate up to 10 MHz.

In the system supporting the bandwidth scalability, the mobile terminal is required to be able to carry out the initial cell search without information on the system bandwidth. The mobile terminal can acquire synchronization with the base station and cell ID for demodulation of data and control information through a cell search procedure. The system bandwidth information can be acquired from the Synchronization CHannel (SCH) in the cell search procedure or by demodulating a Broadcast CHannel (BCH) after the cell search procedure. The BCH is a channel used for transmitting the system information of the cell, which the mobile terminal accesses, and is demodulated first right after the cell search procedure. The mobile terminal can acquire the system information such as the system bandwidths, System Frame Number (SFN), and physical channel configuration of the cell by receiving a shared control channel.

FIG. 2 is a diagram illustrating an exemplary frequency resource mapping of SCH and BCH according to a system bandwidth in a conventional system supporting bandwidth scalability. The mobile terminal performs cell search on the SCH and, once the cell search has completed successfully, acquires the system information on the cell through the BCH. In FIG. 2, the horizontal axis 200 denotes frequency in MHz, and the SCH 204 and BCH 206 having 1.08 MHz bandwidth are transmitted in the middle of the system bandwidth regardless of the bandwidth scale. Accordingly, the mobile terminal can find the Radio Frequency (RF) carrier 202 regardless of the bandwidth scale of the system and acquire an initial synchronization to the system by performing the cell search on the SCH 204 defined by 1.08 MHz bandwidth centering on the RF carrier 202. After finding the cell, the mobile terminal demodulates the BCH 206 transmitted within the same 1.08 MHz bandwidth centering on the RF carrier 202 to acquire the system information.

FIG. 3 is a diagram illustrating a frame format of a 10 ms radio frame of an LTE system in which the SCH and BCH are transmitted. The SCH is transmitted in the forms of Primary Synchronization Signal (PSS) and Secondary Synchronization Signal (SSS) on every $0^{th}$ subframe (subframe #0) and every $5^{th}$ subframe (subframe #5). Each of the PSS and SSS has a length equal to an OFDM symbol duration and is transmitted through 1.08 MHz bandwidth in the middle of the system bandwidth 303 as shown in FIG. 2. The BCH 302 is transmitted for four OFDM symbol durations within the subframe #0.

In the LTE system, the base station (an evolved Node B or eNB) transmits Physical Downlink Control CHannel (PDCCH) information to the mobile station (a User Equipment or UE) about the resource allocation, i.e. Physical Downlink Shared CHannel (PDSCH). In the LTE system, 1, 2, or 3 OFDM symbols at the beginning of a subframe are used for the PDCCH and the remaining OFDM symbols are used for the PDSCH. The reason that the PDCCH is located in the first OFDM symbols of the subframe is that the UE can reduce the power consumption by employing a micro sleep mode for the PDSCH region when no PDSCH is allocated. The UE needs to perform a number of PDCCH blind decodings to a group of PDCCH candidates for control information. In the blind decoding scheme, the eNB transmits the PDCCH using one of multiple control channel candidates, and the UE performs decoding without information on which a control channel candidate is used for the transmission of the control channel. The success or failure of the blind decoding depends on the Cyclic Redundancy Check (CRC) result.

FIG. 4 is a diagram illustrating a principle of uplink resource allocation resource allocation for transmitting a random access preamble in an LTE system. Referring to FIG. 4, the Physical Uplink Control CHannel (PUCCH) is transmitted on a reserved frequency region 402 at the edges of the total available bandwidth in the uplink, and 6 consecutive Resource Blocks (RBs) 403 of the rest part of specific subframes 401 are allocated for the transmission of random access preamble without overlapping with the PUCCH region. This is called Physical Random Access CHannel (PRACH). The PRACH region allocation information for the random access preamble transmission is provided by means of the system information transmitted by the eNB.

In an LTE system, the UE receives the system information (including a set of preamble sequences, resource allocation information for the preamble transmission, Random Access Radio Network Temporary Identifier (RA-RNTI), and preamble transmission power) transmitted by the eNB, and performs random access based on the system information.

In a first step: The UE selects a preamble sequence (hereinafter referred to as message 1) from the preamble sequence set and transmits the selected preamble sequence to the eNB on a random PRACH in the frame.

In a second step: The eNB transmits a message (hereinafter referred to as message 2) containing the corresponding preamble sequence index, Temporary Radio Network Temporary Identifier (Temp-RNTI), and uplink scheduling information on the PDSCH. The PDSCH is indicated using the PDCCH having a CRC scrambled with the RA-RNTI.

In a third step: The UE acquires the PDCCH using the RA-RNTI and receives message 2 from the PDSCH based on the PDCCH. If the sequence index of message 2 and the sequence index of message 1 are identical to each other, the UE transmits a message (hereinafter referred to as message 3) containing the UE ID, contention resolution information, and scheduling request information to the eNB based on the uplink scheduling information acquired from message 2. If the sequence indices are not identical to each other, the UE performs the first step again.

In a fourth step: The eNB transmits a contention resolution message (hereinafter referred to as message 4) to the UE on the PDSCH by using the UE ID acquired from message 3. The PDSCH allocation information is indicated by the PDCCH having a CRC scrambled with the Temp-RNTI transmitted in message 2. The UE checks the PDCCH by using the Temp-RNTI and receives message 4 by using the PDCCH. The UE compares the IDs of message 3 and message 4 and, if the IDs are identical with each other, transmits an ACKnowledgement (ACK) message to the eNB and configures the Temp-RNTI as Cell Radio Network Temporary Identifier (C-RNTI). If the IDs are not identical to each other, the UE performs the first step again.

LTE-Advanced (LTE-A) requires new technologies to support the bandwidth wider than that of the LTE system. The basic obstacle to the high speed data transmission using limited resources is the signal distortion caused by path loss. In order to overcome the path loss problem, a wireless relay technology has been introduced. The wireless relay technology compensates for the path loss of the transmission signal by placing a wireless relay node between the transmitter and the receiver so as to improve the reception performance of the UE, especially at the cell boundary, and increase the system coverage area.

In the case where the wireless relay node receives and transmits signals simultaneously, the transmission signal is likely to interfere the reception signal. Accordingly, the relay node is required to separate the transmission and reception links. There are two techniques for separating the transmission and reception links.

The first technique is to utilize Time Division Duplex (TDD) which separates the transmission and reception links in time over the same frequency band. The second technique is to utilize Frequency Division Duplex (FDD) which separates the transmission and reception links by using different frequency resources at the same time. In FDD, there is a relatively wide frequency offset between the transmission and reception bandwidths to avoid the interference between them, which translates into bandwidth waste. Accordingly, the TDD is preferable for the asymmetry transmission.

In the meantime, the wireless relay system classifies the relay nodes into four types:

Layer 0 Relay (L0 relay): amplifies and then forwards all of the received signal;

Layer 1 Relay (L1 relay): amplifies and then forwards the received signal has other function in addition to that of the L0 relay;

Layer 2 Relay (L2 relay): modulates, decodes, encodes, and then forwards received signal; and Layer 3 Relay (L3 relay): has base station functions in addition to the relay function.

In the case where the system using the relay nodes other than the L3 relay node, all the UEs can perform random access using the same system information. At this time, the eNB cannot identify which relay node is used for the random access attempt of each UE. Accordingly, the eNB cannot determine the reception timing of the physical channel related to the random access in consideration of the propagation latency of the UE attempting the random access via a relay node. There is, therefore, a need to develop a method for identifying the relay node which the UE uses for random access.

SUMMARY OF THE INVENTION

In order to solve at least the above problems of prior arts, the present invention provides a physical channel communication method for random access of a UE that enables a base station to identify the relay nodes and UEs attached to the relay nodes in a wireless communication system in which all the intra-cell relay nodes and UEs use the same system information (including the set of preamble sequences, resource allocation information for the preamble transmission, Random Access network Temporary Identifier (RA-RNTI), and preamble transmission power). Also, the present invention provides a physical channel communication method for random access of a UE in a wireless relay communication system that is capable of supporting the random accesses of the UEs to the eNB via multiple relay nodes.

In accordance with an embodiment of the present invention, a physical channel communication method for random access in a wireless communication system includes receiving, by at least two relay nodes connected to a base station, system information containing a Physical Random Access CHannel (PRACH) region allocation information for identifying user equipments attached to the relay nodes; receiving PRACHs for random accesses transmitted by the user equipments; and transmitting the PRACHs to the base station on relay node-specific resource regions according to the PRACH region allocation information.

In accordance with another embodiment of the present invention, a wireless communication system includes a base station; at least two relay nodes connected to the base station; and a plurality of user equipments attempting access to the base station via the relay nodes, wherein each relay node includes a downlink receiver for receiving system information containing a Physical Random Access CHannel (PRACH) region allocation information for identifying user equipments attached to the relay nodes, an uplink receiver for receiving PRACHs transmitted by the user equipments, and an uplink transmitter for transmitting the PRACHs to the base station on relay node-specific resource regions according to the PRACH region allocation information.

In accordance with still another embodiment of the present invention, a random access method for a wireless communication system includes receiving, by at least two relay nodes connected to a base station, system information containing a Physical Random Access CHannel (PRACH) region allocation information for identifying user equipments attached to the relay nodes;

transmitting PRACHs from user equipments to the relay nodes; transmitting the PRACHs from the relay nodes to the base station in subframe indicated by the PRACH region allocation information, the PRACH region allocation information comprising time indices or frequency indices; and identifying, by the base station, the user equipments attached to the relay nodes based on the PRACH region allocation information.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Figure 1:
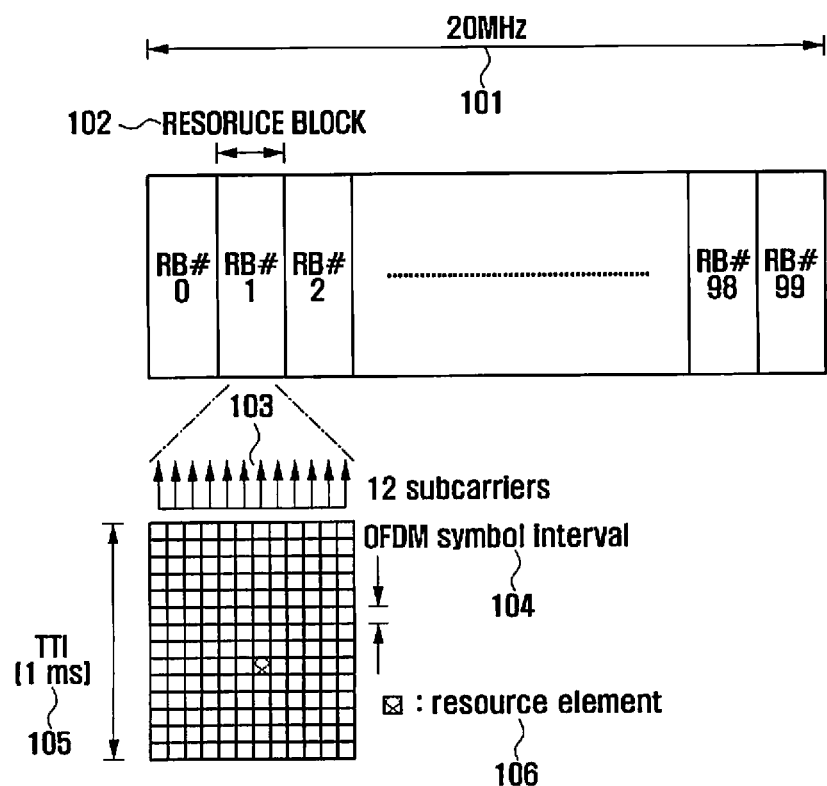
FIG. 1 is a diagram illustrating an OFDM-based downlink frame structure in Evolved Universal Terrestrial Radio Access (EUTRA) specified in the 3$^{rd}$ Generation Partnership Project (3GPP) standards.
Figure 2:
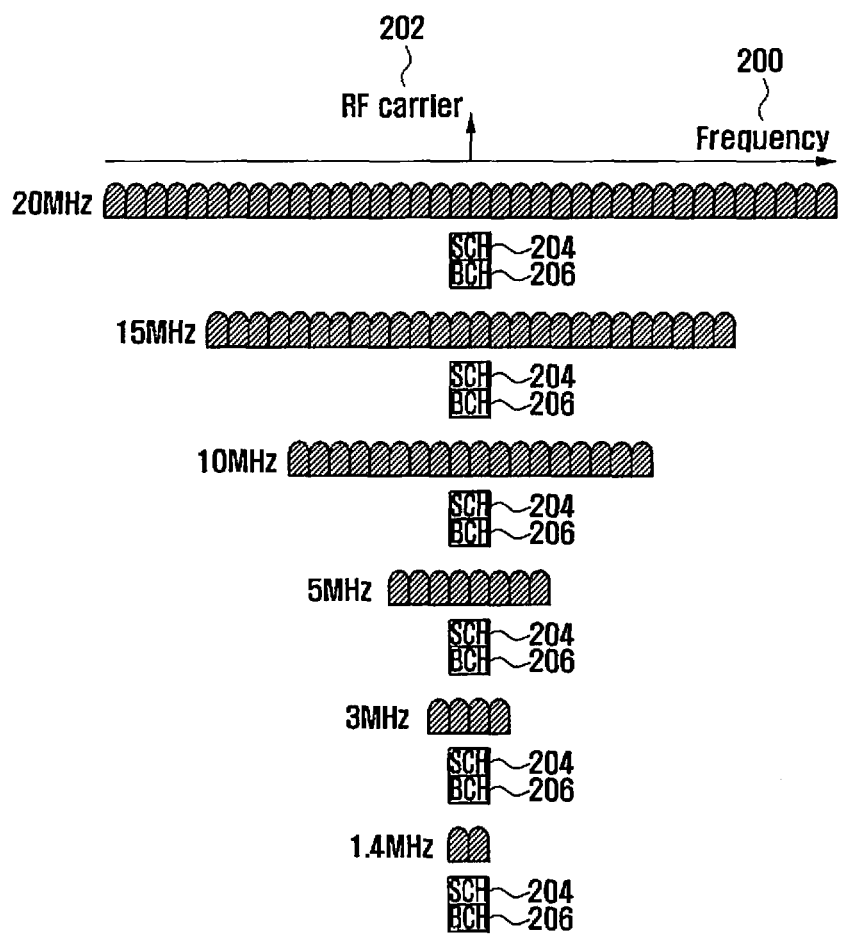
FIG. 2 is a diagram illustrating an exemplary frequency resource mapping of SCH and BCH according to a system bandwidth in a conventional system supporting bandwidth scalability.
Figure 3:
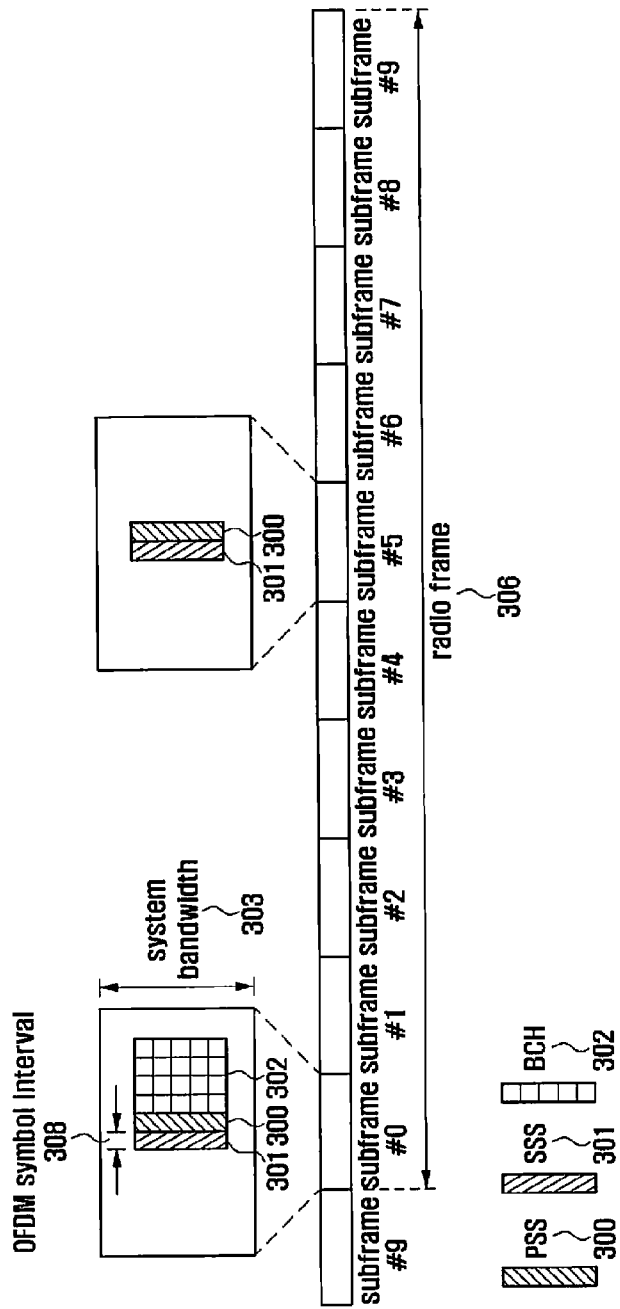
FIG. 3 is a diagram illustrating a frame format of a 10 ms radio frame of an LTE system in which the SCH and BCH are transmitted.
Figure 4:
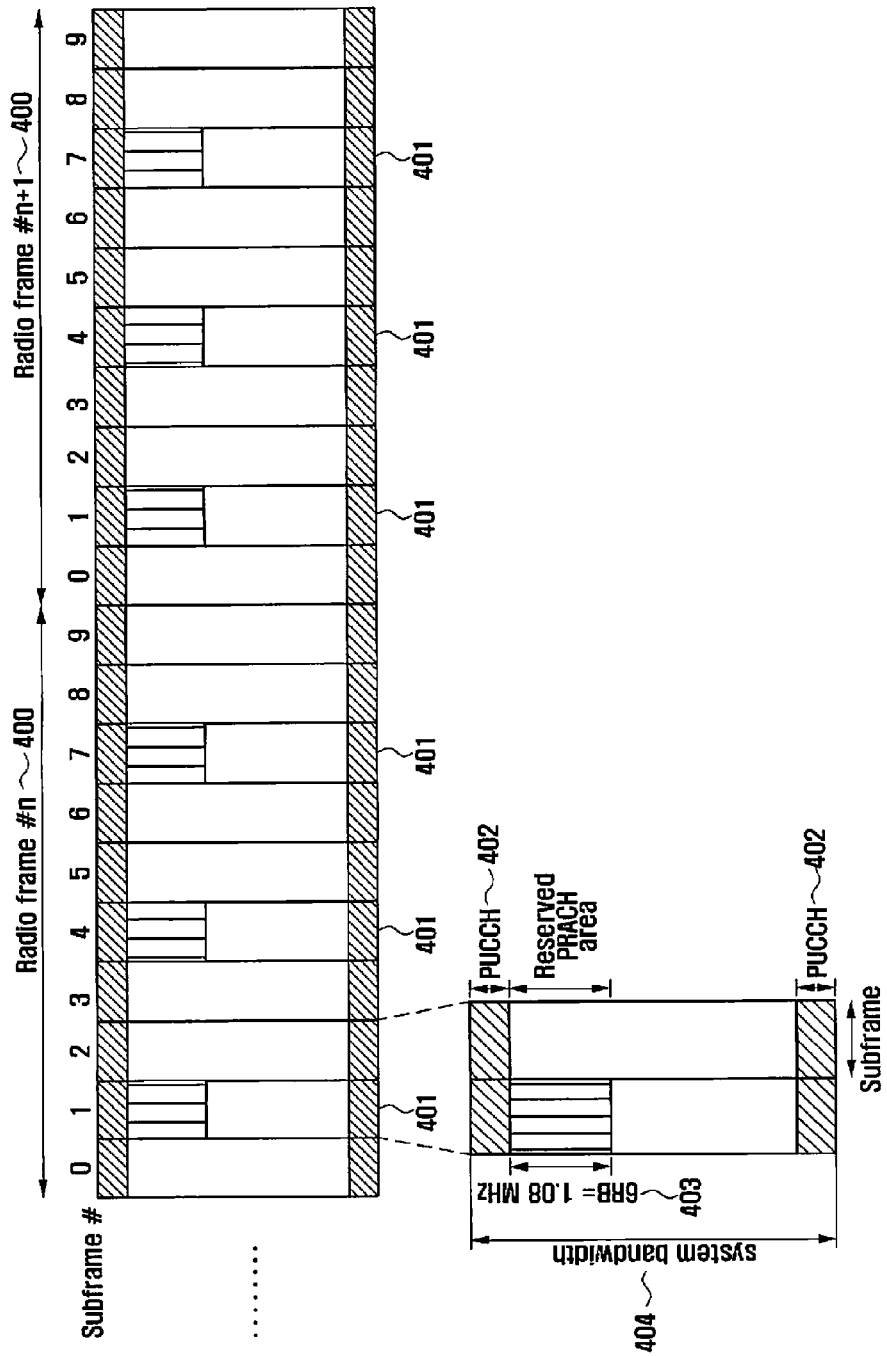
FIG. 4 is a diagram illustrating a principle of uplink resource allocation resource allocation for transmitting a random access preamble in an LTE system.

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. The terms used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

The following description is directed to the 3GPP Evolved Universal Terrestrial Radio Access (EUTRA) based on OFDM, but as will be clear to those skilled in the art of the present invention the principle of the present invention is applicable to other communication systems operating based on a similar technical background without departing from the scope of the present invention.

In a wireless communication system, signal distortion caused by path loss restricts the system coverage with limited transmission power, and wireless relay technology is introduced to overcome this problem. A relay node compensates for the path loss of the transmission signal of the signal and maintains the communication performance between the transmission end and the reception end. In an embodiment of the present invention, a physical channel transmission method for the random access of the UE in a wireless communication system supporting the wireless relay technology. The physical channel transmission/reception method according to an embodiment of the present invention enables the eNB to identify the UE attempting random access via relay nodes.

An embodiment of the present invention provides a physical channel transmission method for random access of a UE that enables a base station to identify the relay node through which the UE attempts the random access in a wireless communication system in which all the intra-cell UEs use the same system information. Particularly, an embodiment of the present invention provides a method and apparatus for transmitting/receiving physical channels related to the UE's random access among the eNB, relay nodes, and terminal. The system information includes the set of preamble sequences, resource allocation information for the preamble transmission, Random Access network Temporary Identifier (RA-RNTI), and preamble transmission power.

First to fourth embodiments of the present invention are described in detail hereinafter.

In the first embodiment of the present invention, the individual relay nodes transmit the respective Shared CHannels (SCHs) to the corresponding UEs after different predetermined subframe timing offsets, whereby the subframes between the eNB and relay nodes and the relay nodes and UEs are determined differently. The relay nodes and the UEs attempting random access acquire the PRACH information for the random access from the system information. The relay nodes are allocated relay node-specific PRACH regions for transmitting random access preambles to the corresponding UEs by the eNB through supplementary system information (PRACH region allocation information). In this manner, the eNB can identify the UEs attached to the relay nodes.

The allocated PRACH regions are placed in different subframes according to the timing offsets of the relay nodes, and the relay nodes transmit the random access preamble sequences received on the corresponding PRACH regions to the eNB. In order to discriminate among the relay-node specific preamble sequences of the UEs, the relay nodes are allocated different resources (PRACH region allocation information).

In the second embodiment of the present invention, the individual relay nodes transmit the SCHs received from the eNB after the same subframe timing offset such that the same subframe number is determined between the relay nodes and UEs. The relay nodes and the UEs attempting the random access acquire the PRACH region information for the random access from the system information. Also, the relay nodes receive the relay node-specific PRACH region allocation information in supplementary system information transmitted by the eNB. The eNB can discriminate among the UEs attached to the respective relay nodes.

In the third embodiment of the present invention, the individual relay nodes transmit the SCHs received from the eNB after different predetermined subframe timings, whereby the subframes between the eNB and relays and between the relays and UEs are determined differently. The relay nodes and the UEs attempting random access acquire the PRACH region information for the random access from the system information transmitted by the eNB, and the relay nodes are allocated relay node-specific PRACH region allocation information for transmitting the random access preamble from the eNB by means of supplementary system information. As aforementioned, the eNB can discriminate among the UEs attached to different relay nodes. The third embodiment of the present invention differs from the first embodiment of the present invention in that only one relay node-specific PRACH region exists in a subframe. The third embodiment can be applied to a narrowband system such as a 1.4 MHz bandwidth system. Each relay node transmits the PRACH received from the UE to the eNB using the PRACH region information allocation information. Here, the subframe timing offset value of each relay node can be changed.

In the fourth embodiment of the present invention, the individual relay nodes transmit the SCHs received from the eNB after the same predetermined subframe timing, whereby the subframes numbers between the relay nodes and the terminals are determined identically. The relay nodes and the UEs attempting random access acquire the PRACH region information for the random access from the system information transmitted by the eNB. Also, each relay node acquires the relay node-specific PRACH region allocation information for the transmission of the random access preamble or the UE from supplementary system information transmitted by the eNB. In this manner, the eNB can discriminate among the UEs attached to different relay nodes. The fourth embodiment of the present invention differs from the second embodiment of the present invention in that only one relay node-specific PRACH region exists in a single subframe. The fourth embodiment can be applied to the narrowband system such as a 1.4 MHz bandwidth system. Each relay node transmits the PRACH received from the UE to the eNB using the resource allocated to the relay node. Here, the subframe timing offset value of each relay node can be changed.

In the above described embodiments of the present invention, the relay nodes of the wireless relay system in which the relay nodes and UEs use the same system information (i.e. the set of preamble sequences, PRACH region allocation information, Random Access network Temporary Identifier (RA-RNTI), and preamble transmission power) transmit the PRACHs of UEs to the eNB using the pre-allocated resources such that the eNB can recognize which relay nodes are used for random accesses of the respective UEs. Accordingly, the eNB can control the random accesses of the UEs per relay node, thereby facilitating the random accesses of the UEs via the relay nodes. Also, the eNB can check which UE is connected to which relay node so as to manage the backhauling resource per relay node. Such information is provided to each relay node such that the relay node can transmit the data of only the UE attached thereto, resulting in a reduction of interference and transmission power. Also, the embodiments of the present invention specify the detailed operations of the relay node for the random access of the UE in the wireless relay system.

In an embodiment of the present invention, the PRACH region allocation information can be included in the system information transmitted by the eNB. The PRACH region allocation information (message 1) is the information that is capable of differentiating the relay nodes transmitting the PRACH information and can be a time or frequency resource. The description is made of the case where PRACH region allocation information is the frequency resource (resource for transmitting the PRACH information on different bandwidth in the same subframe) in the first and second embodiments of the present invention, while the PRACH region allocation information is the time resource (resource for transmitting the PRACH information on the same bandwidth in the different subframes) in the third and fourth embodiments of the present invention.

In the first to fourth embodiments of the present invention, the PRACH information can be the message 1 transmitted from the UE to the relay node, and message 1 denotes the preamble sequence selected from a preamble sequence set.

In an embodiment of the present invention, more than two relay nodes are attached to a single eNB, and the eNB can differentiate the UEs connected to the relay nodes when they transmit the random access information of the UEs to the eNB. For this purpose, each relay node receives the system information containing the PRACH region allocation information for discriminating the attached UEs from the eNB, receives the PRACHs from the UEs for random accesses, and transmits the received PRACHs to the eNB in the subframe according to the PRACH region allocation information such that the eNB can differentiate the relay nodes.

In the first and second embodiments of the present invention, the PRACH region allocation information is the information indicating different bandwidths of the relay nodes, and the relay nodes transmit the PRACH information to the eNB on the different bandwidths in the same subframe according to the PRACH region allocation information. The eNB checks the PRACH information of the relay nodes transmitted on different bandwidths in the same subframe to discriminate among the UEs connected to the individual relay nodes.

In the first embodiment of the present invention, the relay nodes have different subframe timing offsets for the PRACH communications with the corresponding UEs, and the UEs transmit the PRACH information to the attached relay nodes according to the preset subframe timing offsets. In the second embodiment of the present invention, the relay nodes perform the PRACH communication with the UEs in the same subframe, and the UEs transmit the PRACH information to the attached relay nodes according to the preset subframe timing offsets.

In the third and fourth embodiments of the present invention, the PRACH region allocation information is the information for the relay nodes to transmit the PRACH information in the subframes having different subframe numbers, and the relay nodes transmit the PRACH information received from the UEs to the eNB in different subframes according to the PRACH region allocation information. The eNB checks the PRACH information by the relay nodes in different subframes to differentiate the UEs connected to the individual relay nodes.

Detailed descriptions are made of the physical channel transmission/reception methods and apparatuses for the random access of the UE in the wireless communication system according to the embodiments of the present invention.

First Embodiment

Figure 5:
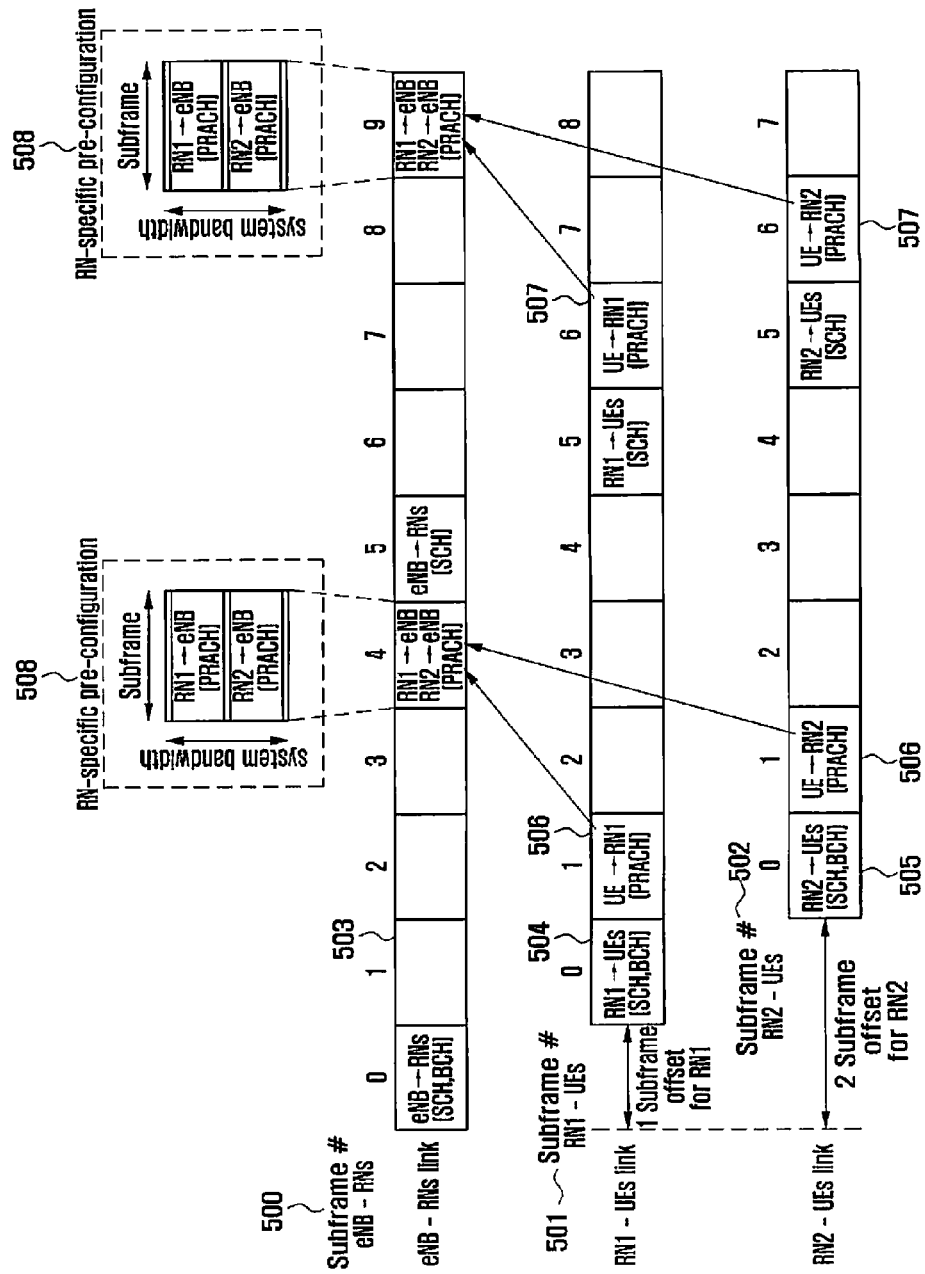
FIG. 5 is a diagram illustrating a principle of the method for transmitting PRACHs in a wireless communication system including timing-unsynchronized multiple relay nodes according to a first embodiment of the present invention.

FIG. 5 is a diagram illustrating a principle of the method for transmitting PRACHs in a wireless communication system including timing-unsynchronized multiple relay nodes according to the first embodiment of the present invention. A description is made under the assumption that two Relay Nodes (RNs) have links established with the same eNB.

Referring to FIG. 5, reference numeral 500 denotes the subframe numbers on the links between the eNB and the RNs, and reference numerals 501 and 502 denote the subframe numbers on the links between the RNs and the UEs attached thereto. The relay nodes RN1 and RN2 transmit the SCH received from the eNB in the subframe 503 (subframe #0) on the eNB-RNs links to the UEs attached thereto after the different subframe timing offsets such that the subframe timings between the relay nodes RN1 and RN2 and the UEs attached thereto are different from each other as denoted by reference numerals 501 and 502. The relay nodes and the UEs attempting random accesses to the eNB acquire the information on the PRACH regions allocated for the random accesses from the system information transmitted by the eNB, and the relay nodes are allocated relay node-specific PRACH regions for the transmissions of the random access preambles of the UEs attached thereto by means of supplementary system information. The relay nodes are allocated relay-node specific PRACH regions for the transmission of the random access preamble of the UEs attached thereto such that the eNB can discriminate among the UEs per relay node.

As shown in FIG. 5, the relay nodes RN1 and RN2 have different subframe timing offsets so as to receive the PRACH messages transmitted by the UEs attached thereto at different points in time. The eNB allocates the relay node-specific PRACH regions to relay nodes RN1 and RN2. The PRACH region allocation can be a time resource or a frequency resource. In the embodiment of FIG. 5, the relay nodes transmit the PRACH messages to the eNB on different bandwidths. As shown in FIG. 5, the eNB receives the PRACH messages transmitted by the relay nodes RN1 and RN2 on the different bandwidths in the same subframe, thereby discriminating the UEs attached to the respective relay nodes.

In more detail, the PRACH regions are allocated in the subframe 506 (subframe #1) and the subframe 507 (subframe #6), and the relay node RN1 and the relay node RN2 transmit the random access preamble sequences received on the UE-specific PRACH regions to the eNB using the RN-specific PRACH region 508. In order to discriminate among the preamble sequences of the UEs attached to the respective relay nodes, the relay node-specific resources of the different relay nodes are allocated on different bandwidths. Here, the subframe timing offset of each relay node can be changed.

Figure 6:
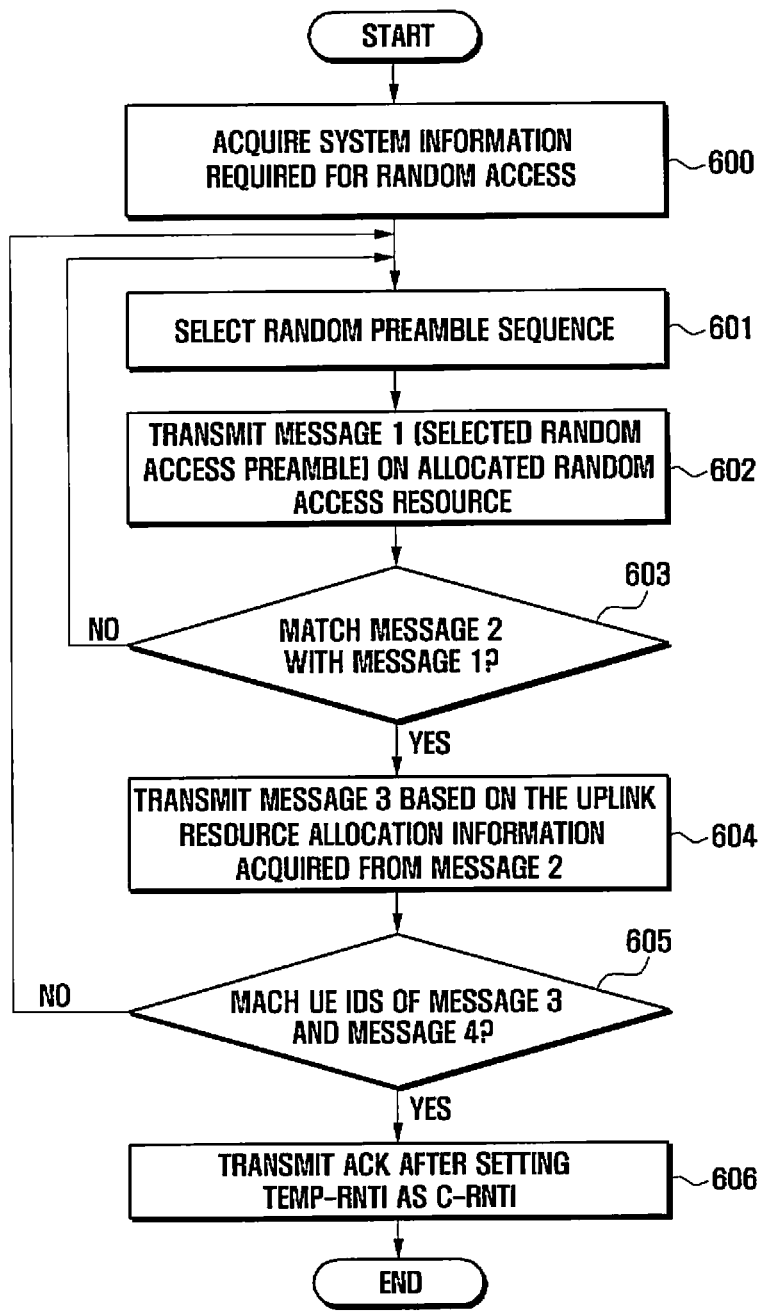
FIG. 6 is a flowchart illustrating a physical channel transmission method for random access of a UE in view of the UE according to the first embodiment of the present invention.

FIG. 6 is a flowchart illustrating a physical channel transmission method for random access of a UE in view of the UE according to the first embodiment of the present invention.

Referring to FIG. 6, the UE first receives the system information required for the random access from a relay node in step 600. The system information includes a preamble sequence set. Next, the UE selects a random access preamble from the preamble sequence set in step 601 and transmits a message 1 carrying the selected preamble sequence on the allocated PRACH region in step 602. The subcarrier symbols generated by the preamble sequence generator of the UE are multiplexed into the pre-allocated PRACH region. The signal transmitted on the PRACH region contains a subframe timing offset as described with reference to FIG. 5 and is forwarded after the time corresponding to the UE-specific subframe timing offset has elapsed. Here, message 1 means the preamble sequence selected from the preamble sequence set. After transmitting message 1, the UE receives a message 2 in response to message 1 and determines whether the sequence numbers of message 1 and message 2 are identical with each other. Message 2 is a message transmitted from the eNB to the UE and includes the preamble sequence, Temp-RNTI, and uplink scheduling information.

If it is determined that the sequence number contained in message 2 is identical to the sequence number of message 1, the UE transmits a message 3 using the Physical Uplink Shared CHannel (PUSCH) allocation information acquired from message 2 in step 604. Message 3 carries and includes a unique UE ID, contention resolution information, and scheduling request information. After transmitting message 3, the UE receives a message 4 in response to message 3 and determines whether the UE ID contained in message 4 is identical to that transmitted by means of message 3 in step 605. Message 4 is a contention resolution message carrying the UE ID transmitted in message 3. That is, message 4 is a contention resolution message using the UE ID. If it has been determined that the UE ID contained in message 4 is identical to the UE ID transmitted by means of message 3, the UE sets the Temp-RNTI as the C-RNTI and then transmit an ACK message in step 606. Otherwise, if it is determined that the UE IDs are not identical to each other at step 605, the procedure returns to step 601.

Figure 7:
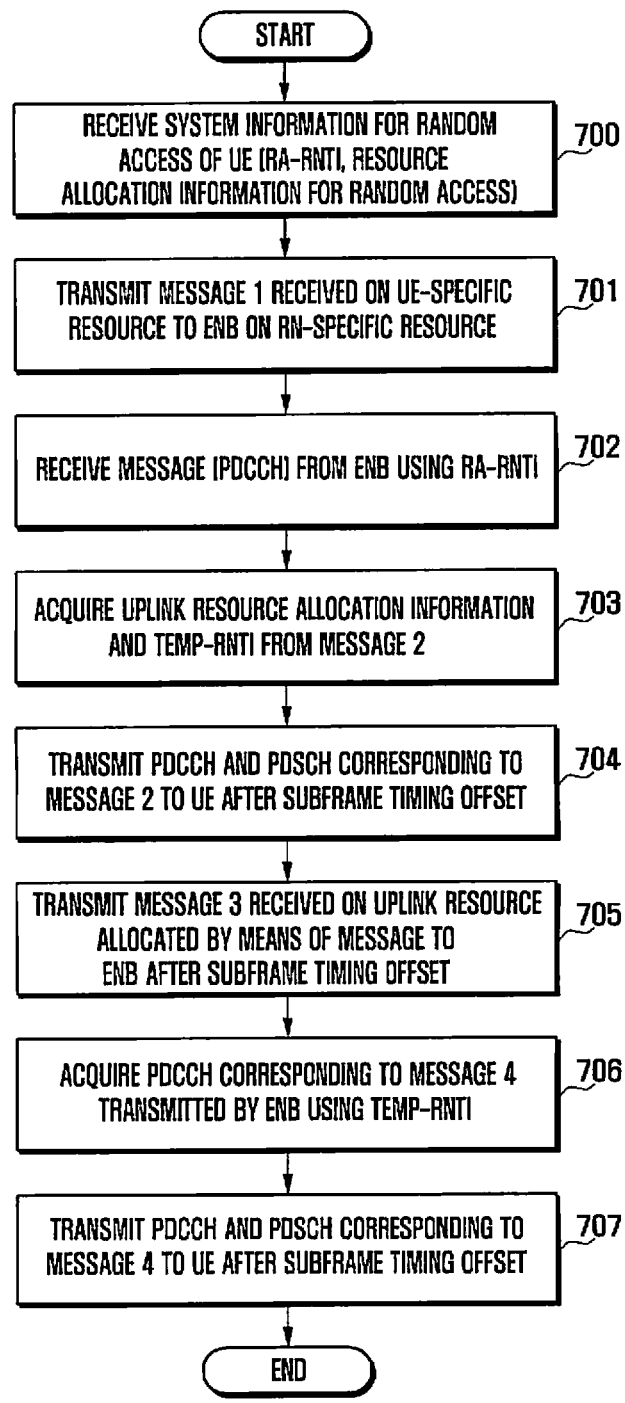
FIG. 7 is a flowchart illustrating a physical channel transmission method for random access of a UE in view of a relay node according to the first embodiment of the present invention.

FIG. 7 is a flowchart illustrating a physical channel transmission method for random access of a UE in view of a relay node according to the first embodiment of the present invention.

Referring to FIG. 7, the relay node receives an RA-RNTI and the PRACH region allocation information for the random access of the UE by means of the system information transmitted by the eNB in step 700. The system information includes the RA-RNTI and resource allocation information for random access. The eNB transmits the system information containing the PRACH region allocation information to the relay nodes, and the PRACH region allocation information can be the relay node-specific resource allocation information. Once the RA-RNTI and the PRACH region allocation information have been acquired, the relay node receives message 1 from the UE and forwards message 1 to the eNB using the resource allocated for the transmission of message 1 in step 701.

As described with reference to FIG. 5, the relay nodes (RN1 and RN2) have the different subframe timing offsets for the communication with the UEs attached thereto and transmit the PRACH information of the UEs using different relay node-specific resources. The relay node RN1 has the subframe timing offset corresponding to one subframe, and the relay node RN2 has the subframe corresponding to two subframes. The relay nodes RN1 and RN2 transmit the PRACH information received from different UEs to the eNB using the different resources. Accordingly, the eNB receives the PRACH informations transmitted by the relay nodes RN1 and RN2 on different resources, thereby discriminating among the connections of the UEs to the relay nodes.

The relay node acquires the PDCCH for message 2 received from the eNB using the RA-RNTI in step 702 and then acquires message 2 of PDSCH from message 2 based on the PDCCH in step 703. Message 2 includes the PUSCH resource allocation information and the Temp-RNTI. The relay node transmits the PDCCH and the PDSCH related to message 2 to the UE after the corresponding subframe timing offset in step 704.

The UE generates message 3 containing the UE ID, contention resolution information, and scheduling request information by using the uplink scheduling information acquired from message 2 and transmits message 3, and the relay node transmits message 3 (which is transmitted by the UE on the PUSCH resource acquired in message 2) to the eNB after the subframe timing offset (i.e. applies the configured timing offset and transmits message 3 after the timing offset) in step 705. The relay node acquires the PDCCH corresponding to message 4 transmitted by the eNB using the Temp-RNTI and acquires the PDSCH resource information of the message 4 from the PDCCH in step 706. Finally, the relay node transmits the PDCCH and PDSCH corresponding to the message 4 to the UE after the subframe timing offset in step 707.

Figure 8:
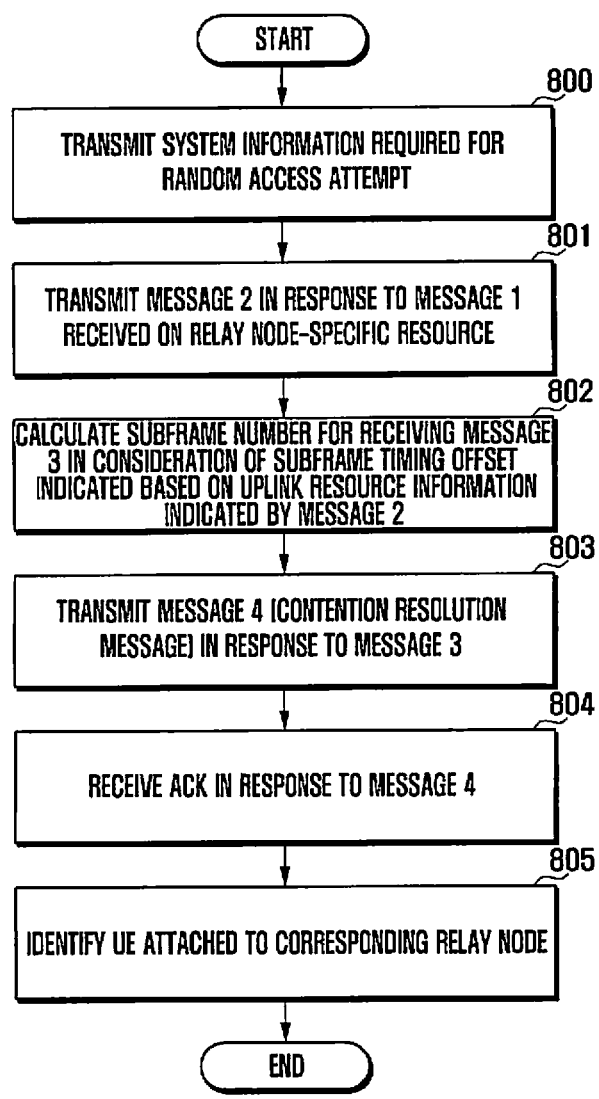
FIG. 8 is a flowchart illustrating a physical channel transmission method for random access of a UE in view of an eNB according to the first embodiment of the present invention.

FIG. 8 is a flowchart illustrating a physical channel transmission method for random access of a UE in view of an eNB according to the first embodiment of the present invention.

Referring to FIG. 8, the eNB transmits the system information required for the random access of the UE to the relay node in step 800. The system information includes the RA-RNTI, random access preamble sequence set, PRACH region allocation information, preamble transmission power, relay node-specific PRACH region (i.e, the region which the relay node uses for transmitting the PRACH of the UE to the eNB). The relay node-specific PRACH region allocation information is used for allocating different resources to different relay nodes. If message 1 has been received on the relay node-specific resources, the eNB transmits message 2 in response to message 1 in step 801. The eNB receives the PRACHs transmitted by the relay nodes on the different relay node-specific PRACH regions as denoted by reference numeral 508 of FIG. 5 and unambiguously checks the relay nodes which the UEs are connected.

The eNB calculates the subframe number for receiving message 3 in consideration of the subframe timing offsets of the relay nodes indicated by the uplink resource allocation information (here it can be PUSCH) carried by message 2 in step 802. The eNB can successfully receive message 3 successfully by determining the reception timing of the message transmitted by the UE in consideration of the propagation delay via the relay nodes. If message 3 has been received, the eNB transmits a message 4, i.e. the contention resolution message, in response to message 3 in step 803. The eNB receives the ACK message in response to message 4 in step 804 and identifies the UEs attached via the corresponding relay nodes in step 805.

Second Embodiment

Figure 9:
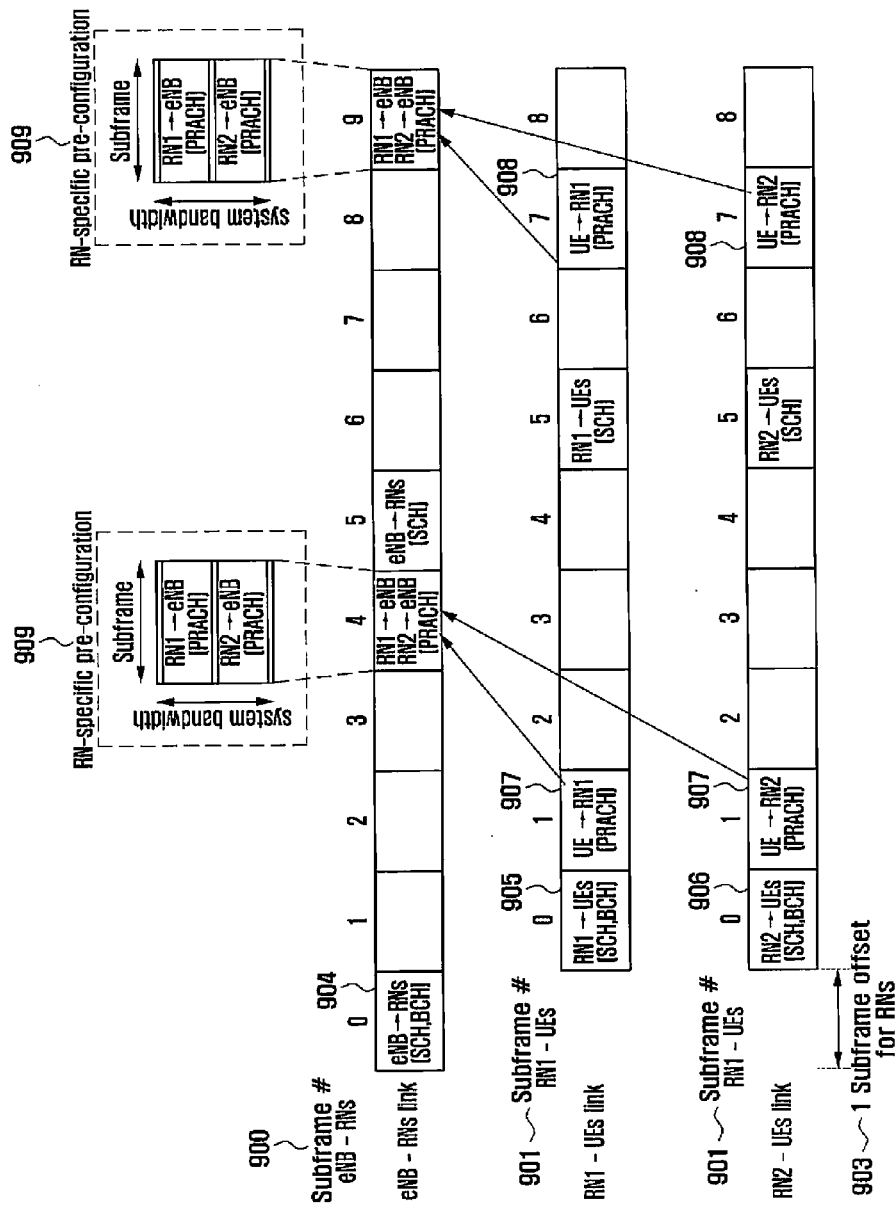
FIG. 9 is a diagram illustrating a principle of the method for transmitting PRACHs in a wireless communication system including timing-synchronized multiple relay nodes according to a second embodiment of the present invention.

FIG. 9 is a diagram illustrating a principle of the method for transmitting PRACHs in a wireless communication system including timing-synchronized multiple relay nodes according to the second embodiment of the present invention. A description is made under the assumption of two Relay Nodes (RNs) that have the links established with the same eNB.

Referring to FIG. 9, reference numeral 900 denotes the subframe numbers on the links between the eNB and the RNs, and reference numerals 901 and 902 denote the subframe numbers on the links between the RNs and the UEs attached thereto. The relay nodes RN1 and RN2 receive the Synchronization CHannel (SCH) transmitted by the eNB in the subframe 904 (subframe #0) on the eNB-RNs links and transmit the SCH to the UEs attached thereto after a subframe timing offset 903 such that the UEs attached to the two relay nodes RN1 and RN2 receive the SCH at the same time as denoted by reference numerals 905 and 906. In FIG. 9, the relay nodes RN1 and RN2 have the same subframe timing offset equal to the length of one subframe. The relay nodes and the UEs attempting random accesses to the eNB acquire the information on the PRACH regions allocated for the random accesses from the system information transmitted by the eNB, and the relay nodes RN1 and RN2 are allocated relay node-specific PRACH regions for the transmissions of the random access preambles of the UEs attached thereto by means of supplementary system information. The relay nodes further receive the supplementary system information (PRACH region allocation information) for the relay node-specific PRACH regions such that the relay nodes can transmit the random access preambles of the UEs attached thereto on the relay node-specific PRACH regions. The relay nodes are allocated relay-node specific PRACH regions for the transmission of the random access preamble of the UEs attached thereto such that the eNB can discriminate among the UEs per relay node.

In more detail, the PRACH regions are allocated in the subframe 907 (subframe #1) and the subframe 908 (subframe #7), and the subframe timing offsets of the relay nodes RN1 and RN2 are set to the same value. The relay nodes RN1 and RN2 transmit the random access preamble sequences received on the UE-specific PRACH regions to the eNB at the same time on the relay node-specific PRACH regions allocated in the subframe 909. Since the relay node-specific PRACH regions are allocated on the different resources (bandwidths) according to the system information transmitted by the eNB, the PRACH information of the UEs are transmitted on different bandwidths of the respective relay nodes in the same subframe 909. As shown in FIG. 9, the relay nodes RN1 and RN 2 are configured with the same subframe timing offset which is equal to the duration of one subframe, and transmit the random access preamble sequences received on the UE-specific PRACH regions in the subframe 907 at the same time to the eNB on the RN-specific PRACH regions of different bandwidths in the subframe 909. In order to discriminate among the preamble sequences of the UEs attached to the relay nodes RN1 and RN2, the different resources are allocated to the relay nodes. Here, the subframe timing offsets of the relay nodes can be changed.

The relay node-specific resource allocation method of the second embodiment depicted in FIG. 9 is identical with that of the first embodiment depicted in FIG. 5, except that the relay nodes are configured with the same subframe timing offset. That is, the relay nodes communicate with the UEs attached thereto by using the same subframe offset but transmit the PRACH information received from the UEs attached thereto to the eNB using different relay node-specific PRACH resources.

Third Embodiment

Figure 10:
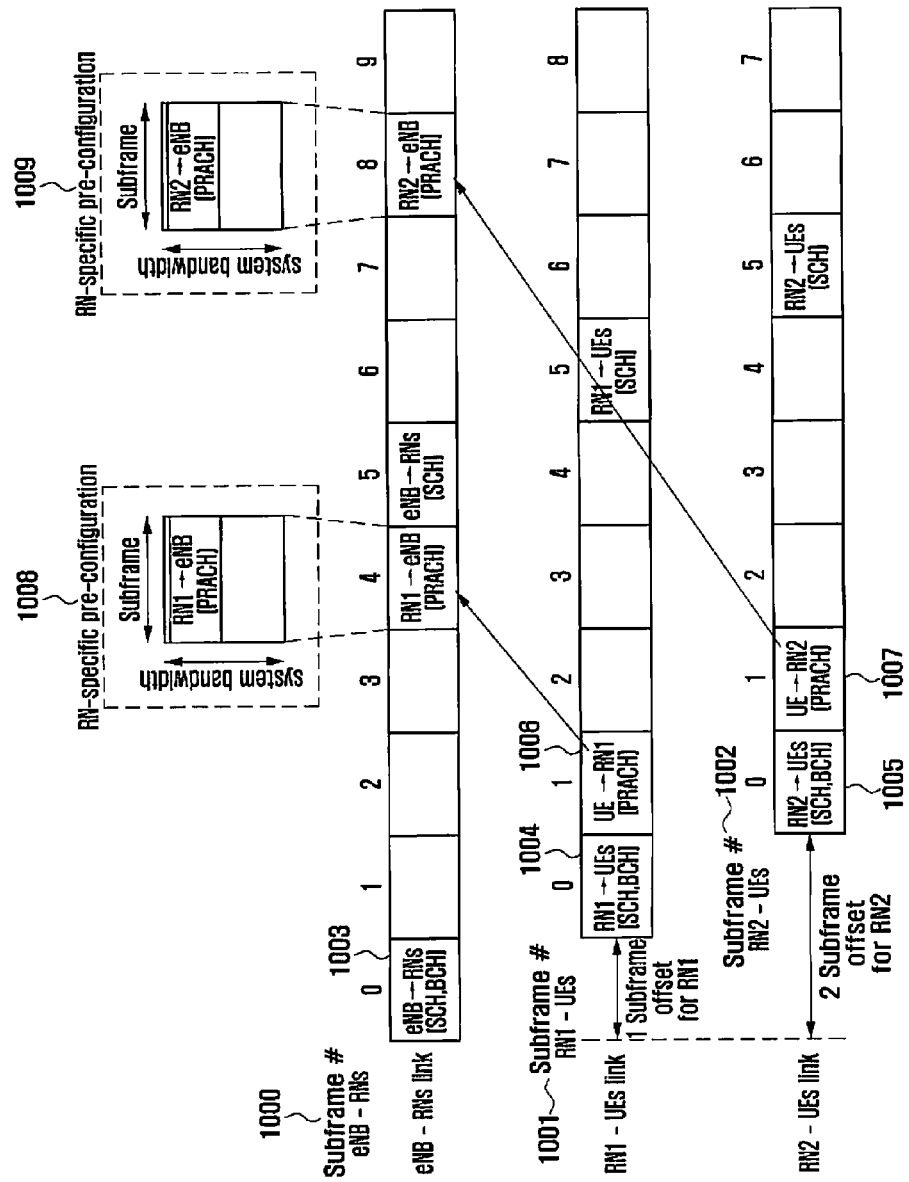
FIG. 10 is a diagram illustrating a principle of the method for transmitting PRACHs in a wireless communication system including timing unsynchronized multiple relay nodes according to a third embodiment of the present invention.

FIG. 10 is a diagram illustrating a principle of the method for transmitting PRACHs in a wireless communication system including timing unsynchronized multiple relay nodes according to the third embodiment of the present invention.

The relay node-specific resource allocation method of the third embodiment depicted in FIG. 10 is identical with that of the first embodiment depicted in FIG. 5, except that PRACH regions for different relay nodes are allocated in different subframes. In the third embodiment of the present invention, the relay nodes transmit the SCH received from the eNB in the subframe 1003 (subframe #0) on the eNB-RNs links to the UEs attached thereto after different subframe timing offsets such that the subframe timings between the relay nodes RN1 and RN2 and the UEs attached thereto are different from each other as denoted by reference numerals 1001 and 1002. As shown in FIG. 10, the relay node RN1 has a subframe timing offset equal to the length of one subframe and the relay node RN2 has a subframe timing offset equal to the length of 2 subframes as compared to the subframe timing of the eNB such that the relay nodes RN1 and RN2 start transmission and reception of signal at different points in time. The relay nodes and the UEs attempting random accesses to the eNB acquire the information on the PRACH regions allocated for the random accesses from system information transmitted by the eNB, and the relay nodes are allocated relay node-specific PRACH regions for the transmissions of the random access preambles of the UEs by means of supplementary system information. Unlike the relay node-specific resource allocation in the first embodiment, the relay nodes RN1 and RN2 transmit the random access preamble sequences received on the PRACH regions allocated for the UEs to the eNB using the relay node-specific PRACH regions allocated in different subframes 1008 and 1009. In the third embodiment of FIG. 10, the relay node RN1 transmits the PRACH information of the UE attached thereto to the eNB in the fourth subframe 1008 (subframe #4), and the relay node RN2 transmits the PRACH information of the UE attached thereto to the eNB in the eighth subframe 1009 (subframe #8). This is because a single subframe allows only one relay node-specific PRACH region.

The UE-specific PRACH regions are arranged in different subframe timings due to the different subframe timing offsets of the relay nodes, and the relay nodes transmit the random access preamble sequences received on the UE-specific PRACH regions to the eNB on the relay node-specific PRACH regions allocated in different subframes 1008 and 1009. This is because each of the subframes 1008 and 1009 allows only one relay node-specific PRACH region. In the third embodiment of FIG. 10, the relay node RN1 transmits the information of the PRACH region received in the subframe 1006 to the eNB using the relay node-specific PRACH region allocated in the subframe 1008, and the relay node RN2 transmits the information of the PRACH region received in the subframe 1007 to the eNB using the relay node-specific PRACH region allocated in the subframe 1009.

The relay node-specific resource allocation method according to the third embodiment of the present invention can be applied to a narrowband system such as a 1.4 MHz bandwidth system. The relay nodes transmit the PRACHs received from the UEs attached thereto in the respective subframes 1006 and 1007 to the eNB using the relay node-specific resources 1008 and 1009 allocated thereto respectively. The subframe timing offset of each relay node can be changed.

Fourth Embodiment

Figure 11:
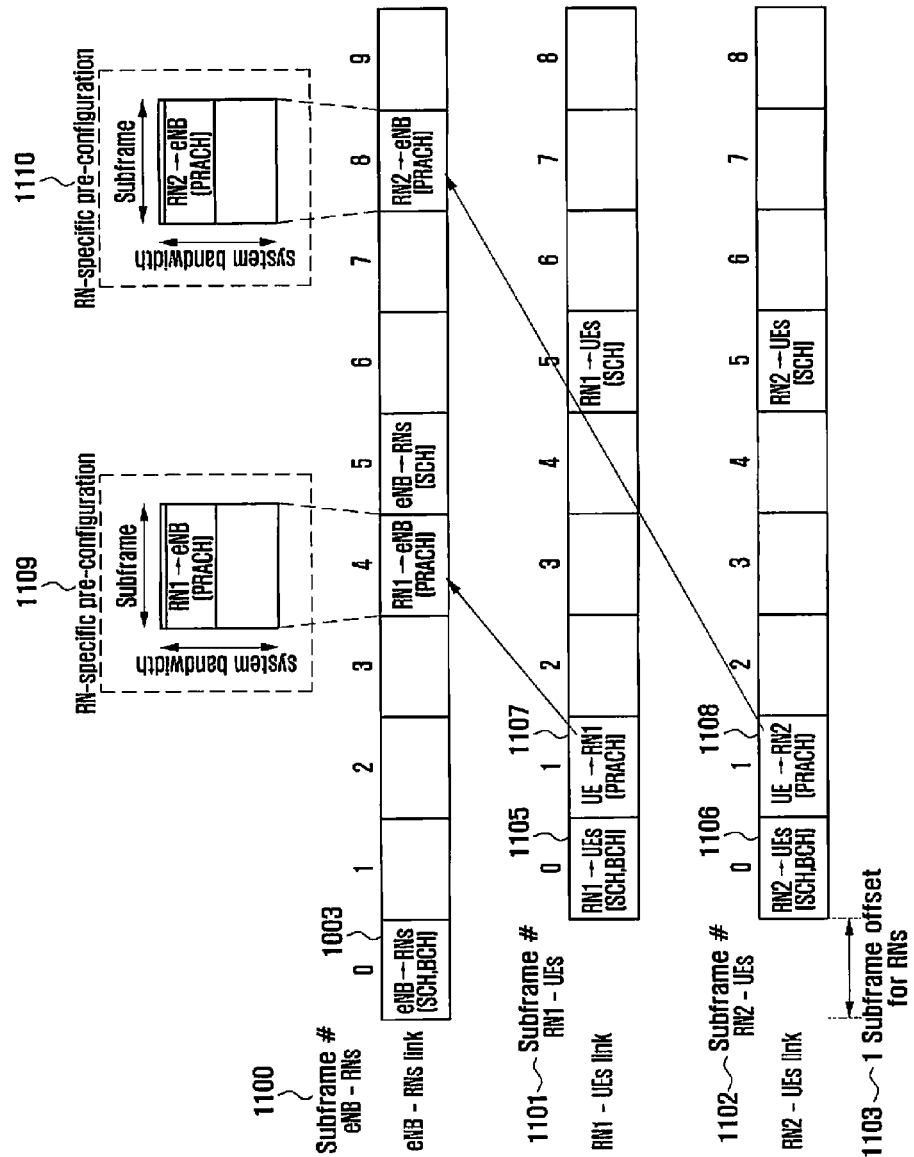
FIG. 11 is a diagram illustrating a principle of the method for transmitting PRACHs in a wireless communication system including timing-synchronized multiple relay nodes according to a fourth embodiment of the present invention.

FIG. 11 is a diagram illustrating a principle of the method for transmitting PRACHs in a wireless communication system including timing-synchronized multiple relay nodes according to the fourth embodiment of the present invention.

The relay node-specific resource allocation method of the fourth embodiment depicted in FIG. 11 is identical with that of the second embodiment of FIG. 9, except that the PRACH regions for different relay nodes are allocated in different subframes. In the fourth embodiment of FIG. 11, reference numeral 1100 denotes the subframe numbers for use on the link between the eNB and the Relay Nodes (NRs), and reference numerals 1101 and 1102 denote the subframe numbers for use on the links between the relay nodes and the UEs attached thereto. The relay nodes transmit the SCH received from the eNB in $0^{th}$ subframe 1104 on the eNB-RNs links to the UEs attached thereto after the same subframe timing offsets such that the subframe timings between the relay nodes and the UEs attached thereto are identical to each other as denoted by reference numerals 1101 and 1102. As shown in FIG. 11, the relay nodes RN1 and RN2 have the same subframe timing offset equal to the length of one subframe. The relay nodes and the UEs attached thereto acquire the information on the PRACH regions for the random accesses from the system information transmitted by the eNB. The relay nodes are allocated the relay node-specific PRACH regions for transmitting the random access preambles of the UEs by means of the supplementary system information transmitted by the eNB. In the fourth embodiment of the present invention, only one relay node can be allocated the relay node-specific PRACH region in a single subframe. Accordingly, the relay node RN1 transmits the PRACH information of the UE attached thereto to the eNB on the relay node-specific resource allocated in the subframe 1109 (subframe #4), and the relay node RN2 transmits the PRACH information of the UE attached thereto to the eNB on the relay node-specific resource allocated in the subframe 1110 (subframe #8).

The UE-specific PRACH regions are arranged in the same subframe timing due to the same subframe timing offsets of the relay nodes, and the relay nodes transmit the random access preamble sequences received on the UE-specific PRACH regions to the eNB on the relay node-specific PRACH regions allocated in different subframes 1109 and 1110. This is because each of the subframes 1109 and 1110 allows only one relay node-specific PRACH region. In the fourth embodiment of FIG. 11, the relay node RN1 transmits the information of the PRACH region received in the subframe 1107 to the eNB on the relay node-specific PRACH region allocated in the subframe 1109, and the relay node RN2 transmits the information of the PRACH region received in the subframe 1108 to the eNB on the relay node-specific PRACH region allocated in the subframe 1110.

The relay node-specific resource allocation method according to the fourth embodiment of the present invention can be applied to a narrowband system such as a 1.4 MHz bandwidth system. The relay nodes transmit the PRACHs received from the UEs attached thereto in the respective subframes 1107 and 1108 to the eNB using the relay node-specific resources 1109 and 1110 allocated thereto, respectively. The subframe timing offset of each relay node can be changed.

Figure 12:
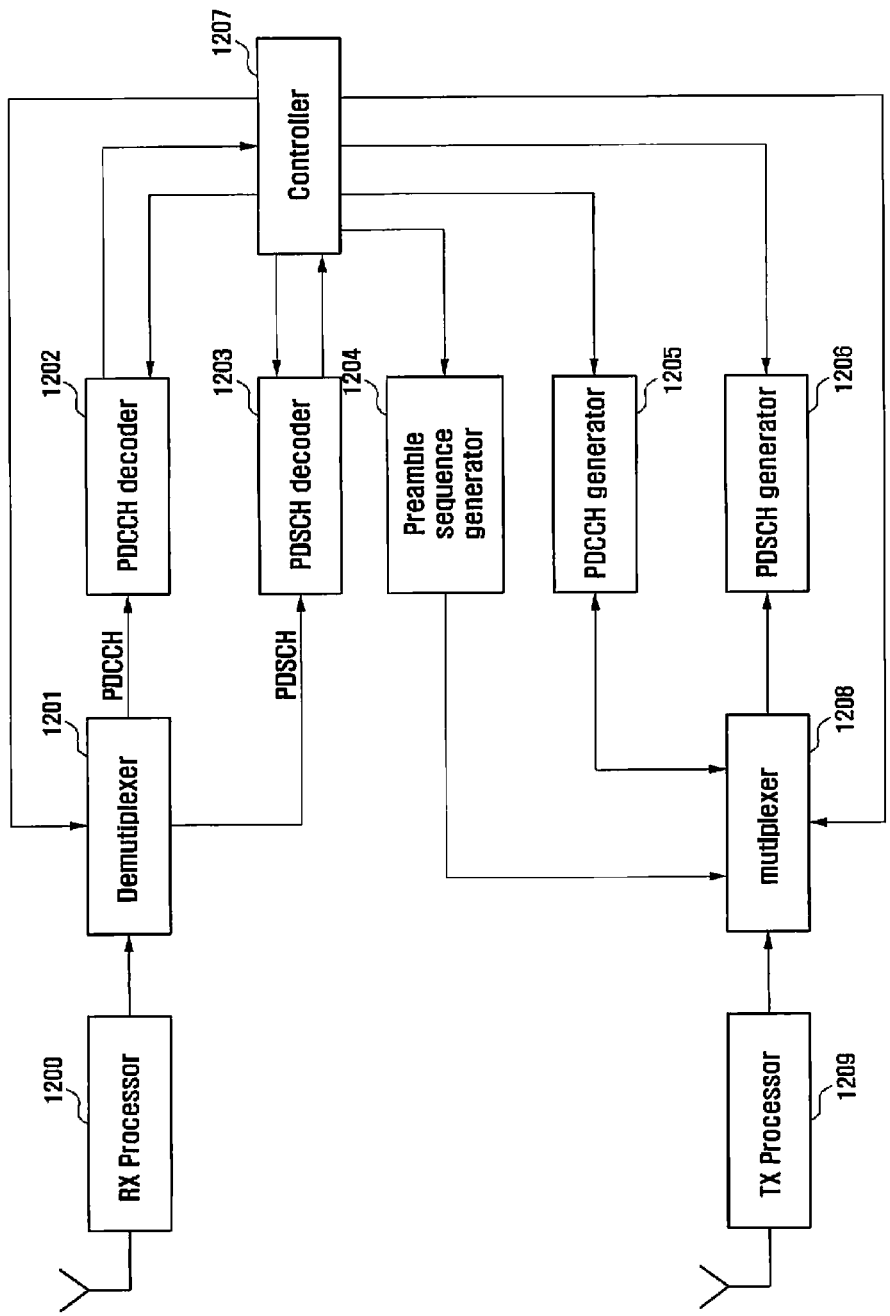
FIG. 12 is a block diagram illustrating a configuration of a transceiver of a UE according to an embodiment of the present invention.

FIG. 12 is a block diagram illustrating a configuration of a transceiver of a UE according to an embodiment of the present invention.

As shown in FIG. 12, the transceiver of the UE includes a reception (RX) processor 1200, a demultiplexer 1201, a PDCCH decoder 1202, a PDSCH decoder 1203, a preamble sequence generator 1204, a PUCCH generator 1205, a PUSCH generator 1206, a controller 1207, a multiplexer 1208, and a transmission (TX) processor 1209.

The radio signal received through the antenna is converted to a baseband signal by the reception processor 1200 and then demultiplexed into the PDCCH and PDSCH by the demultiplexer 1201. The demultiplexed PDCCH and PDSCH are input to the PDCCH decoder 1202 and the PDSCH decoder 1203, respectively. The controller 1207 provides the PDCCH decoder 1202 with the information on the PDCCH candidates for control information such that the PDCCH decoder 1202 decodes the control information from the PDCCH. The controller 1207 also receives the PDSCH allocation information from the PDCCH decoder 1202 and controls the PDSCH decoder 1203 to decode the PDSCH based on the PDSCH allocation information.

The controller 1207 receives the decoding complete message from the PDSCH decoder 1203 and controls the preamble sequence generator 1204, the PUCCH generator 1205, and the PUSCH generator 1206 based on the decoding complete message. The subcarrier symbols generated by the preamble sequence generator 1204, the PUCCH generator 1205, and the PUSCH generator 1206 are input to the multiplexer 1208. The multiplexer 1208 multiplexes the subcarrier symbols and sends the multiplexed subcarrier symbols to the transmission processor 1209, and the transmission processor 1209 transmits the subcarrier symbols.

The subcarrier symbols output by the preamble sequence generator 1204 are multiplexed into the PRACH region allocated to the UE and transmitted (as message 1) as described with reference to step 602 of FIG. 6, and the subcarrier symbols output by the PUSCH generator 1206 are multiplexed into the PUSCH region allocated to the UE and transmitted (as message 3) as described with reference to step 604 of FIG. 6. The controller 1207 stores message 1 (preamble sequence) and message 3 and compares these messages with the respective message 2 and message 4 transmitted by the eNB.

In FIG. 12, the reception processor 1200, the demultiplexer 1201, the PDCCH decoder 1202, the PDSCH decoder 1203, and the controller 1207 correspond to the downlink receiver of the UE, and the controller 1207, the multiplexer 1208, and the transmission processor 1209 correspond to the uplink transmitter of the UE. The uplink transmitter of the UE is provided with the preamble sequence generator 1204 to generate the PRACH information. In the case where a subframe timing offset is configured with the relay node, the uplink transmitter transmits the PRACH information to the relay node according to the subframe timing offset under the control of the controller 1207.

Figure 13:
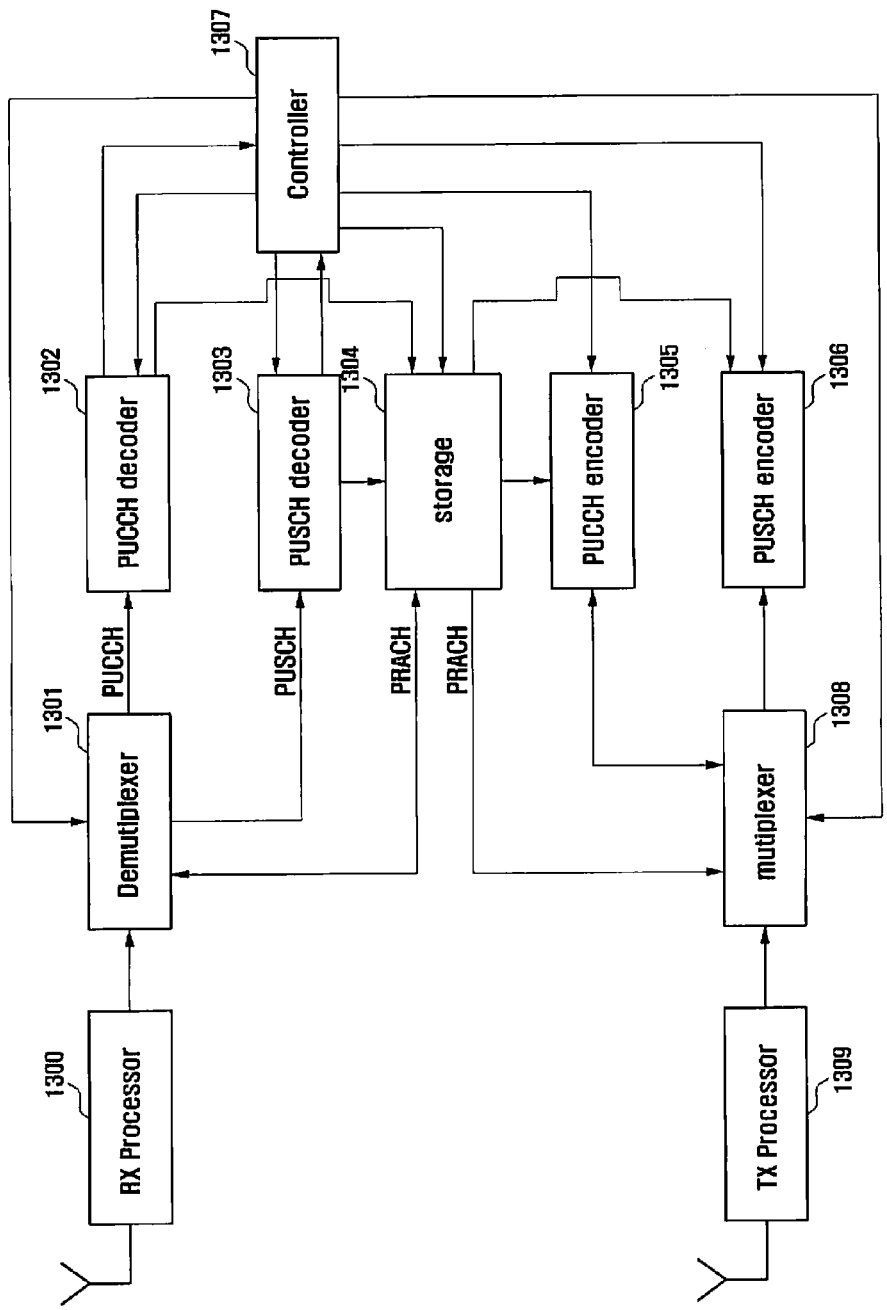
FIG. 13 is a block diagram illustrating a configuration of an uplink transceiver of a relay node according to an embodiment of the present invention.

FIG. 13 is a block diagram illustrating a configuration of an uplink transceiver of a relay node according to an embodiment of the present invention.

As shown in FIG. 13, the uplink transceiver of the relay node includes a reception (RX) processor 1300, a demultiplexer 1301, a PUCCH decoder 1302, a PUSCH decoder 1303, a storage 1304, a PUCCH encoder 1305, a PUSCH encoder 1306, a controller 1307, a multiplexer 1308, and a transmission (TX) processor 1309.

The radio signal received through the antenna is converted to a baseband signal by the reception processor 1300 and then demultiplexed into PUCCH, PUSCH, and PRACH. The demultiplexed PUCCH and PUSCH are input to the respective PUCCH decoder 1302 and PUSCH decoder 1303. The controller 1307 checks the scheduling information transmitted from the eNB to the UE and perceives which uplink channel is used by the UE attached thereto. Although the PRACH signal demultiplexed by the demultiplexer 1301 is input to the storage 1304 directly in FIG. 13, the PRACH signal can be stored after being decoded and then encoded to be transmitted. The PUCCH decoder 1302 and the PUSCH decoder 1303 decode the PUCCH and the PUSCH output from the demultiplexer 1301, respectively, and input the decoded signals to the storage 1304. The controller 1307 controls the PUCCH decoder 1302, the PUSCH decoder 1303, and the storage 1304 such that the PUCCH and PUSCH stored in the storage 1304 are input to the PUCCH encoder 1305 and the PUSCH encoder 1306 after a preset subframe timing offset. The controller 1307 also controls the multiplexer 1308 to multiplex the PRACH into the relay node-specific resource and multiplex the encoded PUCCH and PUSCH into the corresponding resources. The multiplexed signals are transmitted by means of the transmission processor 1309.

In FIG. 13, the reception processor 1300, the multiplexer 1301, the PUCCH decoder 1302, the PUSCH decoder 1303, the storage 1304, and the control unit 1307 correspond to the uplink receiver of the relay node, and the storage 1304, the controller 1307, the PUCCH encoder 1305, the PUSCH encoder 1306, the multiplexer 1308, and the transmission processor 1309 correspond to the uplink transmitter of the relay node. The uplink receiver can receive the PRACH for the random access of the UE, and the uplink transmitter can transmit the received PRACH to the eNB on the relay node-specific PRACH region in the subframe so as to be discriminated from the PRACHs transmitted by other relay nodes.

In order to reduce the implementation complexity of the relay node, the decoders and encoders can be omitted such that the signals demultiplexed by the demultiplexer 1301 can be stored in the storage 1304 and then transmitted through the multiplexer 1308 and the transmission processor 1309.

Figure 14:
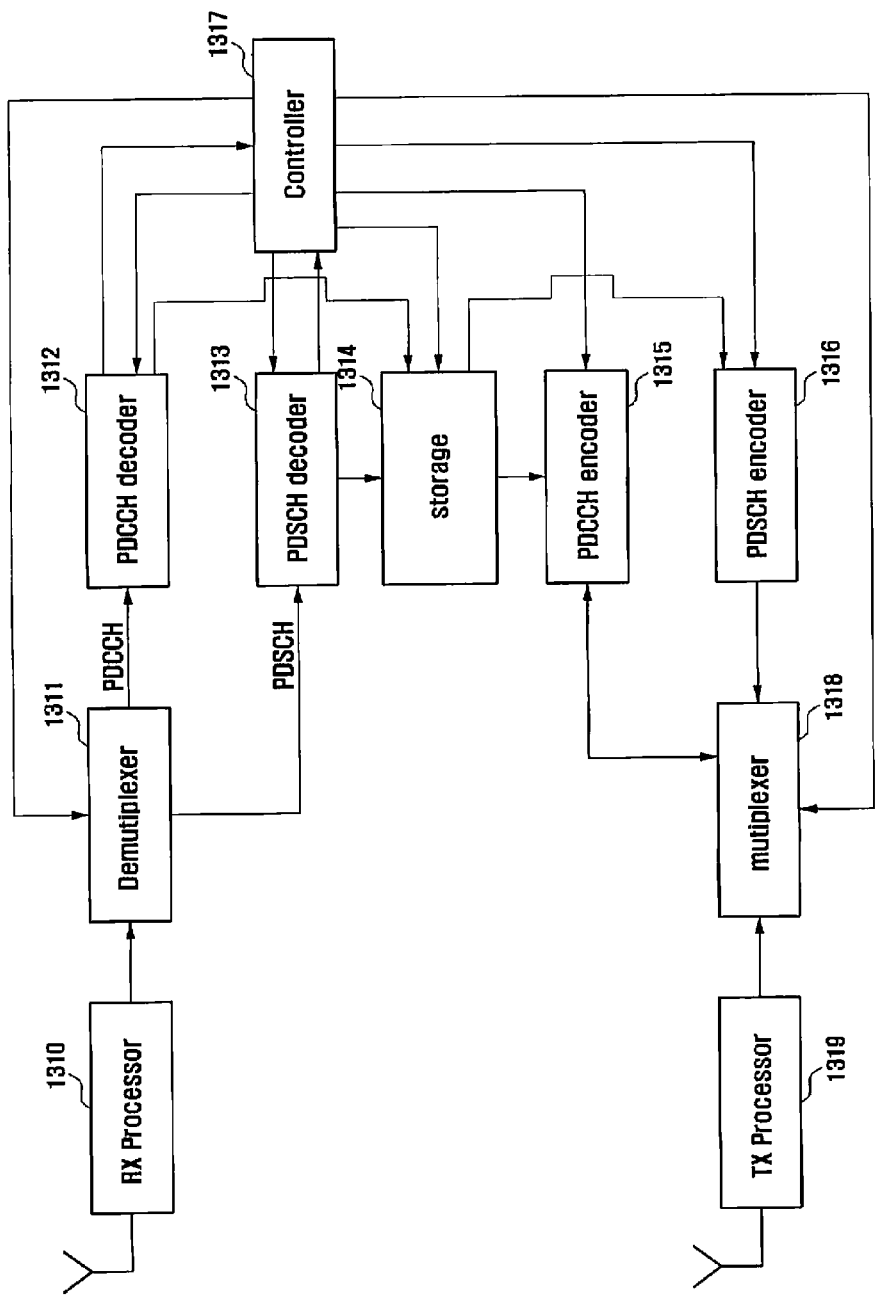
FIG. 14 is a block diagram illustrating a configuration of a downlink transceiver of a relay node according to an embodiment of the present invention.

FIG. 14 is a block diagram illustrating a configuration of a downlink transceiver of a relay node according to an embodiment of the present invention.

As shown in FIG. 14, the downlink transceiver of the relay node includes a reception (RX) processor 1310, a demultiplexer 1311, a PDCCH decoder 1312, a PDSCH decoder 1313, a storage 1314, a PDCCH encoder 1315, a PDSCH encoder 1316, a controller 1317, a multiplexer 1318, and a transmission (TX) processor 1319.

The radio signal received through the antenna is converted into a baseband signal by the reception processor 1310 and then demultiplexed into PDCCH and PDSCH signals. The demultiplexed PDCCH and PDSCH signals are input to the respective PDCCH decoder 1312 and PDSCH decoder 1313. The controller 1317 provides the PDCCH decoder 1312 with the information on the PDCCH candidates such that the PDCCH decoder 1312 performs PDCCH decoding. The controller 1317 receives the information of the PDSCH from the PDCCH decoder 1312. The PDSCH decoder 1313 performs PDSCH decoding based on the PDSCH allocation information input by the controller 1317. The decoded PDCCH and PDSCH are stored in the storage 1314 for the timing offset. The PDCCH and PDSCH stored in the storage 1314 are output to the respective PDCCH encoder 1315 and PDSCH encoder 1316 under the control of the controller 1317. The PDCCH and PDSCH encoded by the PDCCH encoder 1315 and the PDSCH encoder 1316 are multiplexed by the multiplexer 1318 and then transmitted by means of the transmission processor 1319. The controller 1317 controls the operations of the PDCCH encoder 1315, the PDSCH encoder 1316, and the multiplexer 1318.

In FIG. 14, the relay node acquires the RA-RNTI from the system information transmitted by the eNB and the Temp-RNTI from message 2 by using the RA-RNTI and uses the Temp-RNTI for transmitting message 4. For this reason, the PDCCH decoder 1312 and the PDSCH decoder 1313 are required. In consideration of the complexity, the PDCCH encoder 1315 and the PDSCH encoder 1316 can be omitted. In the case where that the relay node is implemented without the PDCCH encoder 1315 and the PDSCH encoder 1316, the PDCCH and PDSCH demultiplexed by the demultiplexer 1311 are stored in the storage 1314 for the subframe timing offset and multiplexed and transmitted under the control of the controller 1317.

The reception processor 1310, the demultiplexer 1311, the PDCCH decoder 1312, the PDSCH decoder 1313, the controller 1317, and the storage 1314 correspond to a downlink receiver of the relay node, and the controller 1317, the storage 1314, the PDCCH encoder 1315, the PDSCH encoder 1316, the multiplexer 1318, and the transmission processor 1319 correspond to a downlink transmitter of the relay node. The downlink receiver is configured to acquire the PRACH region allocation information for discriminating among the UEs connected to the relay node from the system information transmitted by the eNB.

Figure 15:
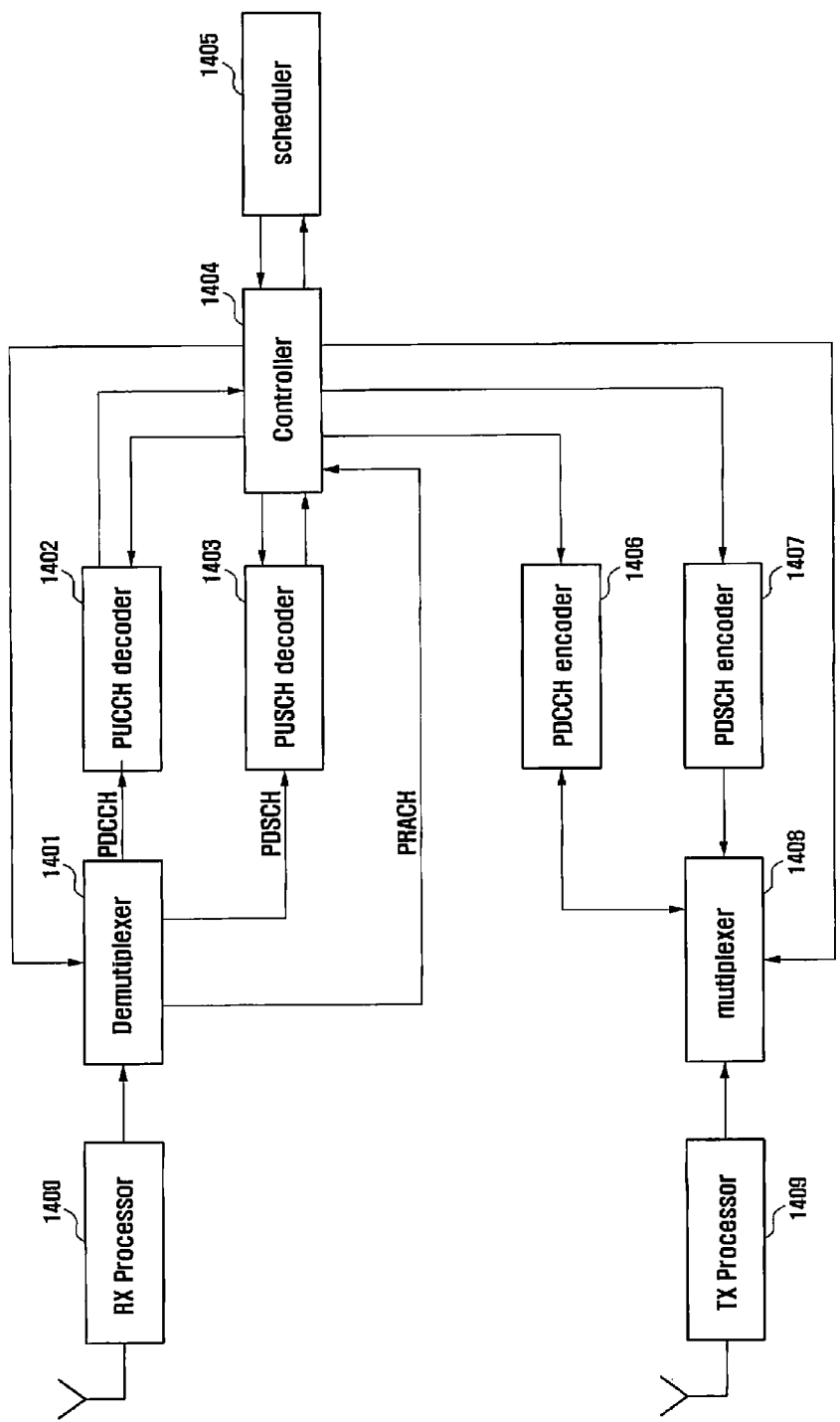
FIG. 15 is a block diagram illustrating a configuration of a transceiver of an eNB according to an embodiment of the present invention.

FIG. 15 is a block diagram illustrating a configuration of a transceiver of an eNB according to an embodiment of the present invention.

As shown in FIG. 15, the transceiver of the eNB includes a reception (RX) processor 1400, a demultiplexer 1401, a PUCCH decoder 1402, a PUSCH decoder 1403, a controller 1404, a scheduler 1405, a PDCCH generator 1406, a PDSCH generator 1407, a multiplexer 1408, and a transmission (TX) processor 1409.

The radio signal received through the antenna is converted to a baseband signal by the reception processor 1400 and then demultiplexed into the PRACH, PUCCH, and PUSCH signals. The demultiplexed PUCCH and PUSCH signals are input to the respective PUCCH decoder 1402 and PUSCH decoder 1403, and the PRACH signal is input to the controller 1404. The controller 1404 receives the uplink resource allocation information and subframe timing offset per relay node from the scheduler 1405 and controls the operations of the demultiplexer 1401, the PUCCH decoder 1402, and the PUSCH decoder 1403 based on the uplink resource allocation information and the subframe timing offset. The controller 1404 also acquires the preamble sequence number from the PRACH received on the relay node-specific PRACH regions and perceives the relay node which the UE uses for random access to the eNB. The scheduler 1405 makes a scheduling decision to transmit the PDCCH to the UEs. The controller 1404 controls the operations of the PDCCH generator 1406, the PDSCH generator 1407, and the multiplexer 1408 based on the scheduling decision of the scheduler 1405. The sub-carrier symbols generated by the PDCCH generator 1406 and the PDSCH generator 1407 are multiplexed by the multiplexer 1408 and then transmitted by means of the transmission processor 1409.

In FIG. 15, the reception processor 1400, the demultiplexer 1401, the PUCCH decoder 1402, the PUSCH decoder 1403, the controller 1404, and the scheduler correspond to the uplink receiver of the eNB, and the controller 1404, scheduler 1405, the PDCCH generator 1406, the PUSCH generator 1407, the multiplexer 1408, and the transmission processor 1409 correspond to the downlink transmitter of the eNB. The uplink receiver checks the relay node-specific PRACH information transmitted by the relay nodes on the different relay node-specific PRACHs and discriminates among the UEs attached to the relay nodes.

If the PRACH has been received, the controller 1404 controls the PDSCH generator 1407 to transmit message 2 in response to the PRACH as described with reference to step 801 of FIG. 8 and controls the PDCCH generator 1406 for generating the PDCCH corresponding to the PDSCH. If message 3 has been received on the PUSCH region allocated to the UE, the controller 1404 controls the PDSCH generator 1407 to transmit message 4 in response to message 3 as described with reference to step 803 and then controls the PDCCH generator 1406 to generate the PDCCH corresponding to the PDSCH. If the ACK message has been received in response to message 4 on the PUCCH region, the controller 1404 assumes that the random access has been successful and checks which relay node is used by the UE based on the relay node-specific PRACH region on which the PRACH of the UE has been received.

As described with reference to FIGS. 12 to 15, the wireless communication system according to an embodiment of the present invention includes an eNB, at least two relay nodes connected to the eNB, and a plurality of UEs attempting random access to the eNB via the relay nodes. Each relay node includes a downlink receiver for receiving the relay node-specific PRACH region allocation information contained in the system information transmitted by the eNB to identify the UEs connected thereto, an uplink receiver for receiving the PRACHs transmitted by the UEs, and uplink transmitter for transmitting the PRACHs to the eNB on different regions in the subframe according to the PRACH region allocation information.

The PRACH region allocation information in the first and second embodiments of the present invention is the information indicating the resources allocated in different bandwidths, and the uplink transmitter of the relay node transmits the PRACH information received from the UEs in the same frame on different bandwidth according the PRACH region allocation information. The eNB includes an uplink receiver for receiving the uplink signal transmitted by the relay nodes, and the uplink receiver of the eNB checks the PRACH information transmitted by the relay nodes in the same subframe on different bandwidth and discriminates among the UEs attached to the respective relay nodes.

In the first embodiment of the present invention, the uplink receivers of the relay nodes are configured with different subframe timing offsets related to the PRACH communication for the random access of the UEs, and the UE include an uplink transmitter for transmitting the PRACH information. The uplink transmitters of UEs transmit the PRACH information to the attached relay nodes according to the subframe timing offsets.

In the third and fourth embodiments of the present invention, the PRACH region allocation information is the information indicating the PRACH resource allocated in different subframes for the relay nodes, and the uplink transmitter of the relay node transmits the PRACH information received from the UE to the eNB on the resources allocated in different subframes according to the PRACH region allocation information. The eNB includes an uplink receiver for receiving the uplink signal transmitted by the relay nodes, and the uplink receiver of the eNB checks the PRACH information transmitted by the relay nodes in the different subframes and discriminates on the UEs attached to the relay nodes based on the subframe numbers.

As described above, the physical channel transmission method for random access in the wireless communication system including the relay nodes and UEs using the same system information (including the preamble sequence set for random access, resource allocation information for preamble transmission, RA-RNTI, preamble transmission power) allows the relay nodes to transmit the PRACHs of the UEs attached thereto on the relay node-specific resources allocated in different bandwidth or subframes, whereby the eNB can unambiguously identify the relay nodes and the UEs attached to the relay nodes. Accordingly, the eNB can control the random accesses of the UEs via the relay nodes. Since the eNB can discriminate among the relay nodes and attached UEs per relay node, it is possible to efficiently manage the backhauling resources per relay node and provide the relay nodes with the management information such that the relay nodes transmit only the data destined to the UEs attached thereto, resulting in reduction of interferences and transmission power.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A physical channel communication method for random access in a wireless communication system, comprising the steps of:
   receiving, by a relay node, system information containing Physical Random Access CHannel (PRACH) region allocation information, from a base station;
   receiving, at the relay node, PRACHs for random accesses transmitted by user equipments; and
   transmitting the PRACHs, to the base station, from the relay node, on relay node-specific resource regions defined by the PRACH region allocation information for identification of the user equipments based on at least one of bandwidths and subframes in which the PRACHs are transmitted.

2. The physical channel communication method of claim 1, wherein the PRACH region allocation information indicates relay node-specific bandwidths, and the relay node transmits the PRACHs to the base station on different bandwidths in the same subframe.

3. The physical channel communication method of claim 2, further comprising identifying the user equipments attached to the relay node based on the bandwidths on which the PRACHs are transmitted.

4. The physical channel communication method of claim 3, wherein the relay node is configured with different subframe timing offsets for communicating the PRACHs, and the user equipments transmit the PRACHs to the relay node according to the subframe timing offsets.

5. The physical channel communication method of claim 3, wherein the relay node is configured with the same subframe timing offset for communicating the PRACHs, and the user equipments transmit the PRACHs to the relay node according to the subframe timing offsets.

6. The physical channel communication method of claim 3, wherein the PRACH is a preamble sequence selected by a user equipment from a preamble sequence set contained in the system information.

7. The physical channel communication method of claim 1, wherein the PRACH region allocation information includes subframe numbers indicating subframes for the relay node to transmit the PRACHs, and the relay node transmits the PRACHs to the base station on the different subframes indicated by the subframe numbers.

8. The physical channel communication method of claim 7, further comprising identifying the user equipments attached to the relay node based on the subframes in which the PRACHs are transmitted.

9. A wireless communication system, comprising:
   a base station;
   a relay node connected to the base station; and
   a plurality of user equipments attempting access to the base station via the relay node,
   wherein the relay node includes a downlink receiver for receiving, from the base station, system information containing Physical Random Access CHannel (PRACH) region allocation information uplink receiver for receiving PRACHs transmitted by the plurality of user equipments, and an uplink transmitter for transmitting the PRACHs to the base station on relay node-specific resource regions defined by the PRACH region allocation information for identification of the plurality of user equipments based on at least one of bandwidths and subframes in which the PRACHs are transmitted.

10. The wireless communication system of claim 9, wherein the PRACH region allocation information indicates relay node-specific bandwidths, and the relay node transmits the PRACHs to the base station on different bandwidths in the same subframe.

11. The wireless communication system of claim 10, wherein the base station includes an uplink receiver for receiving uplink signals transmitted by the relay node, and the uplink receiver of the base station identifies the user equipments attached to the relay node based on the bandwidths on which the PRACHs are transmitted.

12. The wireless communication system of claim 11, wherein the relay node includes an uplink receiver, the uplink receivers of the relay node being configured with different subframe timing offsets, and each of the user equipments includes an uplink transmitter, the uplink transmitters of the user equipments transmitting the PRACHs according to the different subframe timing offsets.

13. The wireless communication system of claim 12, wherein the PRACH information is a preamble sequence selected by a user equipment from a preamble sequence set contained in the system information.

14. The wireless communication system of claim 9, wherein the PRACH region allocation information includes subframe numbers indicating subframes for the relay node to transmit the PRACHs, and the relay nodes transmit the PRACHs to the base station on the different subframes indicated by the subframe numbers.

15. The wireless communication system of claim 14, wherein the base station includes an uplink receiver for receiving uplink signals transmitted by the relay node, and the uplink receiver of the base station identifies the user equipments attached to the relay node based on the subframes in which the PRACHs are transmitted.

16. A random access method for a wireless communication system, comprising the steps of:
   receiving, by a relay node system information containing Physical Random Access CHannel (PRACH) region allocation information, from a base station;
   transmitting PRACHs from user equipments to the relay node;
   transmitting the PRACHs from the relay node to the base station in one or more subframes defined by the PRACH region allocation information, wherein the PRACH region allocation information comprises time indices or frequency indices; and
   identifying, by the base station, the user equipments attached to the relay node based on at least one of bandwidths and subframes in which the PRACHs are transmitted.

17. The random access method of claim 16, wherein the PRACH region allocation information indicates relay node-specific bandwidths, and the relay node transmits the PRACHs to the base station on different bandwidths in the same subframe.

18. The random access method of claim 17, wherein transmitting the PRACHs from the relay node to the base station comprises:

receiving, by the base station, the PRACHs transmitted by the relay node on different bandwidths; and identifying the user equipments based on the bandwidths on which the PRACHs are received.

19. The random access method of claim 16, wherein the PRACH region allocation information includes subframe numbers indicating subframes for the relay node to transmit the PRACHs, and the relay node transmits the PRACHs to the base station on the different subframes indicated by the subframe numbers.

20. The random access method of claim 19, wherein transmitting the PRACHs from the relay node to the base station comprises:

receiving, by the base station, the PRACHs transmitted by the relay node in different subframes; and identifying the user equipments based on the subframes in which the PRACHs are received.

* * * * *